(12) United States Patent
Jablon et al.

(10) Patent No.: US 11,795,332 B2
(45) Date of Patent: Oct. 24, 2023

(54) COATINGS CONTAINING MICRONIZED POLYMERS AS MATTING AGENTS

(71) Applicant: HONEYWELL INTERNATIONAL INC., Morris Plains, NJ (US)

(72) Inventors: Michael Jablon, Ramsey, NJ (US); Rakesh Vig, Durham, CT (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 15/931,400

(22) Filed: May 13, 2020

(65) Prior Publication Data

US 2020/0362182 A1 Nov. 19, 2020

Related U.S. Application Data

(60) Provisional application No. 62/849,580, filed on May 17, 2019.

(51) Int. Cl.
*C09D 7/65* (2018.01)
*C09D 5/00* (2006.01)

(52) U.S. Cl.
CPC .................. *C09D 7/65* (2018.01); *C09D 5/00* (2013.01)

(58) Field of Classification Search
CPC .................. C09D 7/65; C09D 5/00

USPC .......................................... 524/546
See application file for complete search history.

(56) References Cited

U.S. PATENT DOCUMENTS

| | | | |
|---|---|---|---|
| 4,342,602 | A | 8/1982 | Petz et al. |
| 6,080,902 | A | 6/2000 | Herrmann et al. |
| 10,876,007 | B2 | 12/2020 | Wehner et al. |
| 2012/0009423 | A1 | 1/2012 | Bach et al. |
| 2013/0030106 | A1 | 1/2013 | Chung |
| 2015/0307735 | A1 | 10/2015 | Morea et al. |
| 2016/0115341 | A1* | 4/2016 | Xu .......................... C09D 7/63 427/386 |
| 2018/0112098 | A1 | 4/2018 | Wehner et al. |
| 2018/0305565 | A1 | 10/2018 | Saito et al. |

FOREIGN PATENT DOCUMENTS

| | | |
|---|---|---|
| CN | 108112256 A | 6/2018 |
| DE | 10063422 A1 | 8/2001 |
| JP | H0655900 A | 3/1994 |

* cited by examiner

*Primary Examiner* — Kelechi C Egwim
(74) *Attorney, Agent, or Firm* — LORENZ & KOPF, LLP

(57) ABSTRACT

A matte finish coating for application to a substrate includes in a mixture a coating substance and a micronized polymer matting agent. The matte finish coating comprises the micronized polymer matting agent in an amount, by overall weight of the matte finish coating, of about 0.5% to about 15%.

14 Claims, 18 Drawing Sheets

US 11,795,332 B2

COATINGS CONTAINING MICRONIZED POLYMERS AS MATTING AGENTS

CROSS-REFERENCE TO RELATED APPLICATION

This Application claims the benefit of priority to U.S. provisional patent application Ser. No. 62/849,580, filed on May 17, 2019, titled "COATINGS CONTAINING MICRONIZED POLYMERS AS MATTING AGENTS", the contents of which are herein incorporated by reference in their entirety.

TECHNICAL FIELD

The present disclosure generally relates to the field of commercial coatings, for example but not limited to clear-coats, paints, and inks, among others. More particularly, the present disclosure relates to such coatings that contain micronized polymers as mattings agents.

BACKGROUND

Coatings are versatile and have wide-ranging applications as commercial and industrial protective coatings, use as decorative coatings on walls, floors and other surfaces, paints, inks and other applications. The substrates onto which these coatings can be applied also vary widely, including metals, plastics, wood, films, and papers, among others. In certain applications it is desirable to control the reflectance of light from the surface of the cured coating film. Matting agents are typically added to coatings in order to obtain desired low levels of gloss and sheen. However, selection of a matting agent must be made carefully because the matting agent has a material effect on both the cost of the coating as well as on the physical properties of the coating.

Precipitated or gel silica has been conventionally used as a matting agent. Precipitated or gel silica, however, has been shown to have several undesirable properties when used as a matting agent. For example, such coatings may exhibit burnishing, poor mar, rub, abrasion, and scratch resistance, poor surface slip and feel, loss of efficiency if the coating is stored for long periods of time, settling during storage, friability, high binder demand, and viscosity build-up. Accordingly, it would be desirable to employ alternative matting agents, that do not exhibit the aforementioned difficulties and drawbacks, as either a partial or full replacement to silica in coatings. Furthermore, other desirable features and characteristics of the disclosure will become apparent from the subsequent detailed description and the appended claims, taken in conjunction with the accompanying drawings, brief summary, technical field, and the background of the disclosure.

BRIEF SUMMARY

In accordance with one exemplary embodiment, disclosed is a matte finish coating for application to a substrate that includes in a mixture a coating substance and a micronized polymer matting agent. The matte finish coating comprises the micronized polymer matting agent in an amount, by overall weight of the matte finish coating, of about 0.5% to about 15%.

This brief summary is provided to describe select concepts in a simplified form that are further described in the detailed description, in accordance with various embodiments that encompass the concepts described in the brief summary. This brief summary is not intended to identify key or essential features of the subject matter of the present disclosure, with reference to the claims or otherwise, nor is this brief summary intended to be used as an aid in determining the full scope of the disclosed subject matter, which is properly determined with reference to the various embodiments of the present disclosure.

BRIEF DESCRIPTION OF THE DRAWING FIGURES

A more complete understanding of the disclosure may be derived from the accompanying drawing figures, wherein like reference numerals denote like elements, and wherein:

FIG. 1A is a graph showing the results of gloss testing on a clear-coat composition at 60 degrees, whereas

FIG. 2A is a graph showing the results of gloss testing on a clear-coat composition at 60 degrees, whereas

FIG. 3A is a picture showing the results of abrasion testing on a clear-coat composition using 2% matting agent loading, whereas

Figure 14:
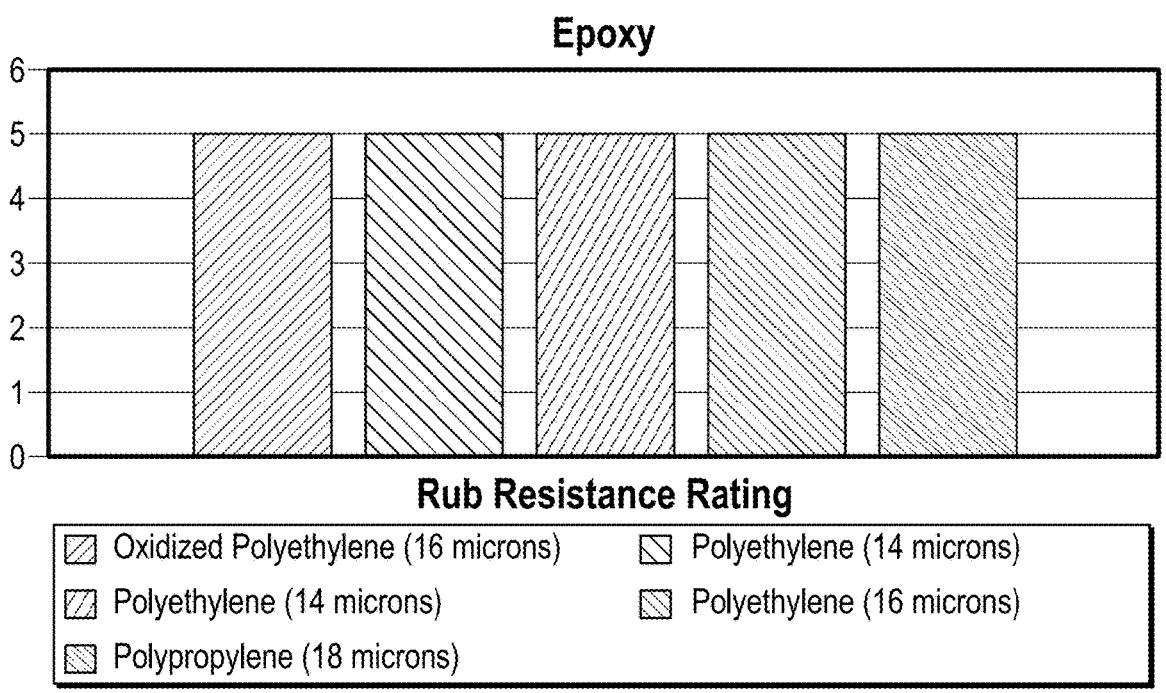
Figure 15:
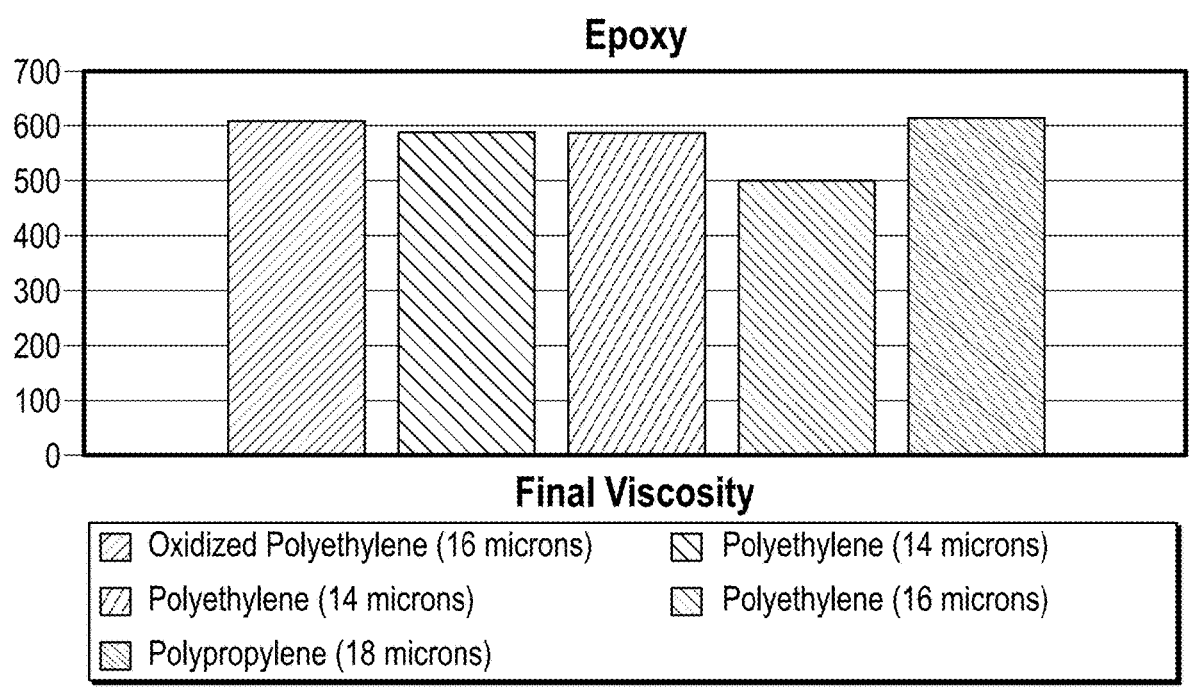

FIG. 14 is a graph showing rub resistance with various particle sizes of polyethylene, oxidized polyethylene, and polypropylene micronized polymer after a 5% polymer addition to the control coating; and FIG. 15 is a graph showing viscosity increase with various particle sizes of polyethylene, oxidized polyethylene, and polypropylene micronized polymer after a 5% polymer addition to the control coating.

DETAILED DESCRIPTION

The present disclosure provides exemplary embodiments of compositions and methods involving the use of micronized polymers, as a partial or full replacement of silica, as a matting agent for coatings. As used herein, the word "exemplary" means "serving as an example, instance, or illustration." Thus, any coatings composition or method embodiment described herein as "exemplary" is not necessarily to be construed as preferred or advantageous over other embodiments. All of the embodiments described herein, are exemplary embodiments provided to enable persons skilled in the art, to make or use the invention, and not to limit the scope of the invention, which is defined by the claims.

Coating Composition

As used herein, the term "coating" or "coating composition" broadly applies to any liquid material, that is applied to a solid substrate, to form a film over the substrate after drying and/or curing. As such, "coatings" as used herein may take the form of a variety compositions used in a variety of industries, such as protective coatings, decorative coatings, paints, inks, and the like.

Coatings generally include one or more film-forming binders and one or more liquid carriers. Coatings may also include 100% solid paint systems and powder coatings. Coatings generally have a a film forming binder content of about 5-100% by weight and correspondingly about 0-95% by weight of liquid carrier. The binder generally includes all the film-forming components that contribute to the solid portion of the cured composition. Generally, catalysts, pigments, and non-polymeric chemical additives such as stabilizers described hereinafter are not considered part of the binder solids. Non-binder solids other than pigments usually do not amount to more than about 5-15% by weight of the composition. Suitable film forming binders can include, for example, polyurethanes, polyesters, polyethylene glycol, polypropylene glycol, polytrimethylene ether glycol, linear and/or branched acrylics and acrylic polyols, acrylic latexes, aqueous latexes, acrylic microgels, aqueous microgels or a combination thereof. In general, the solvent can be any organic solvent and/or water.

Depending on the type and intended function of the coating, one or more additives may optionally be included along with the binder and liquid carrier. Suitable additives can include, for example, pigments, rheology control agents, UV absorbers, light stabilizers, catalysts, antifoam agents or combinations thereof. Pigments suitable for use are well known in the art and can include, for example, carbon black, titanium dioxide, iron oxides, silicon dioxide, zinc phosphate, barium sulfate, azo pigments, phthalocyanine pigments, quinacridone pigments, pyrrolopyrrole pigments, perylene pigments, pearlescent pigments, metal oxide coated metal pigments, titanium dioxide coated aluminum, coated mica or pearl flakes, titanium dioxide coated mica, graphite effect pigments, plate-like iron oxide, plate-like copper phthalocyanine pigments or a combination thereof.

Some non-limiting examples of coatings embodied as inks are now provided. Gravure ink: Gravure is a major commercial printing processes that can be used to print, on a substrate such as papers, plastic films, and others. Text and images can be printed. Gravure is an intaglio process wherein ink is transferred to the paper as drops from very small cells that are recessed into a printing surface, e.g., a cylinder or flat plate. The ink drops flow and selectively spread together to print the text or image. If the surface tension of the ink drop is too high, the ink will not spread quick or far enough causing the print to appear rough and grainy. Gravure is distinguished from other processes such as letterpress printing and lithography. Gravure inks are very fluid, solvent or co-solvent based inks that dry by evaporation to leave a film of resin and pigment on the substrate. Representative solvents and co-solvents include toluene, xylene, alcohols, acetone, aliphatic hydrocarbons, water, and the like.

Flexographic ink: A flexographic printing ink will generally contain a pigment and a binder resin dispersed in water. The binder serves as a carrier for the pigment and affixes the pigment to the surface to be printed. A wide variety of binder systems have been used for flexographic ink compositions, including acrylic and methacrylic polymers and copolymers, rosin modified phenolic resins, polystyrene resins and soy protein. Flexographic printing systems are generally systems having rubber or photopolymer plates, reverse-angle doctor blades, and ceramic anilox rollers in central impression cylinder presses. Flexographic presses can be used to print on the substrate materials such as papers, plastic films, and others. Because flexographic printing systems can use water soluble or water-based ink compositions which are less expensive than oil-based ink compositions, flexographic printing typically costs less than lithographic printing.

Some non-limiting examples of coatings embodied as paints are now provided. Paint typically contains four base ingredients, namely pigment, binder, liquid, and additives. Any or all of these ingredients may be a single component or may include multiple items. Pigment provides color to paint and also makes paint opaque, and pigment is usually of mineral or organic origin, and some pigments are artificially produced. "Prime" pigments provide color and opacity (opaque coverage). A common prime pigment is titanium dioxide, which is white and is used in latex and oil-based paints. Specialty or extender pigments may also be used. The extender pigments are often chosen for their impact on properties like matting, scrub resistance, stain resistance, and chalk resistance. Alum or clay may be used for this purpose. These pigments are added to the paint to provide certain characteristics such as thickness, a certain level of gloss (matting), and durability.

The binder holds the pigment and also adheres it to a substrate surface, and a binder composition may have more than one component. In latex paint, the latex resin is the binder. For example, in latex paint, the binder may be 100% acrylic, vinyl acrylic (polyvinyl acetate), or styreneated acrylic. The pigment particles may be insoluble and merely form a suspension in the binder. The binder "binds" the pigment into a tough, continuous film and as noted above helps the paint adhere to the surface. In many embodiments, the binder begins in the formulation as a liquid, before it dries or cross-links into a film.

Liquids carry the pigment and binders, and the liquid is the part of the paint or coatings product that evaporates. The role of the liquid is to keep the paint in a fluid form for ease of application. Once applied to the surface it evaporates leaving a uniform film, which then dries to form a protective coating. The liquid used is primarily determined by the solubility of the binder. In oil-based and alkyd paints, the liquid is typically a paint thinner, and in latex paints, the liquid is typically water.

Additives are ingredients used at low levels to provide certain properties, such as but not limited to: mildew resistance, better flow and leveling, and splatter resistance. Common additives used in conventional paint formulations include rheology modifiers, surfactants, defoamers, coalescents, and biocides. Other numerous additives are well-known in the art and may be utilized, as required, to formulate a paint having the desired properties.

A non-limiting example of a coating embodied as a clear-coat is now provided. A clear-coat is broadly used herein to refer to a transparent coating that forms an outer interface with the environment. For this reason, clear-coat must be durable enough to resist abrasion and chemically stable enough to withstand UV light. Clear-coat can be either solvent or water-borne. To improve the weatherability, especially of a clear finish produced by the clear-coat composition, an ultraviolet light stabilizer or a combination of ultraviolet light stabilizers can be added to the topcoat composition in the amount of about 0.1-10% by weight, based on the total weight of the binder. Such stabilizers include ultraviolet light absorbers, screeners, quenchers, and specific hindered amine light stabilizers. Also, an antioxidant can be added, in the about 0.1-5% by weight, based on the total weight of the binder. Typical ultraviolet light stabilizers that are useful include benzophenones, triazoles, triazines, benzoates, hindered amines and mixtures thereof.

Micronized Polymers as Matting Agents

As initially set forth above, and as compared to using entirely conventional silicas as a matting agent in the coatings as described above, the present disclosure replaces some, or all of the silica, with micronized polymers as a matting agent. As used herein, micronization refers to the process of reducing the average diameter of a solid material's particles. Techniques for micronization focus on mechanical means, such as milling and grinding. Micronization may also be accomplished using spray micronization. The present disclosure is not intended to be limited by the particular technique of micronization, and thus any known technique may be employed. The term micronization usually refers to the reduction of average particle diameters to the micrometer range. Various polymers may be micronized, such as high-density polyethylene, low-density polyethylene, oxidized polyethylene, polytetrafluoroethylene, polypropylene, maleated polypropylene, and Fischer-Tropsch process polymers, among others.

Micronized polymers may have an average diameter ranging between about 6 microns and about 30 microns, such as about 10 microns and about 25 microns, or about 14 microns and about 18 microns in a preferred embodiment. Commercially available micronized polymers are available under the ACumist® line of products by Honeywell International Inc. of New Jersey, USA. As such, one differentiator between conventional silica and the micronized polymers is the aforementioned average diameter, wherein conventional silica particle sized are typically below about 10 microns. When using silica particles that are any larger, it has been observed, even in as-applied (dried, cured) films of about 50 microns or more, that the silica particles may become visible in the coated film, whereas micronized polymers do not exhibit such concerns. Further, silica particles have a tendency to "stack," such that the particle size may double in the as-applied film, causing similar appearance issues. Still further, silica particles, which cause surface disruption in the as-applied film to achieve matting, are vulnerable to being "too exposed," such that they would be sheared-off under burnishing conditions, whereas the micronized polymers of the present disclosure, instead effect a reduction in the coefficient of friction of the as-applied film, which prevents abrasion and burnishing.

The loading of the micronized polymers into the above-described coating compositions (by weight of the coating composition) may generally be from about 0.5% to about 15%, such as about 1% to about 12%, or about 1.5% to about 10%. Specific loading ranges may thus include form about 0.5% to about 2%, or about 2% to about 5%, or about 5% to about 8%, or about 8% to about 12%, or about 12% to about 15%. An exemplary loading is about 5%, for example from about 4% to about 6%. The micronized polymer loading employed for a particular coating composition may depend on the type and use of coating composition, along with the desired gloss reduction and desired material properties, of the coating composition, as applied.

Silica as a Matting Agent

In accordance with some embodiments of the present disclosure, silica is only replaced partially by the micronized polymers as matting agent, whereas in other embodiments, it is entirely replaced. Accordingly, some, but not all, embodiments include an amount of silica. Therefore, silica is herein described. In general, the silica used to produce the matting agent can be any silica prepared by the gel process or the precipitation process. Natural silicas such as diatomaceous earth and crystalline silica could also possibly be used, in some embodiments.

The loading of the silica into the above-described coating compositions (by weight of the coating composition) may generally be from about 0.5% to about 15%, such as about 1% to about 12%, or about 1.5% to about 10%, or about 2% to about 6%. Specific loading ranges may thus include form about 0.5% to about 2%, or about 2% to about 5%, or about 5% to about 8%, or about 8% to about 12%, or about 12% to about 15%. The silica loading employed for a particular coating composition may depend on the type and use of coating composition, along with the gloss reduction and material properties of the coating composition, as applied.

Within the above-noted ranges of micronized polymer and silica when used in combination, the ratio of micronized polymer to silica, by weight, may range from about 1:10 to about 10:1, for example from about 1:5 to about 5:1, such as about 1:2 to about 2:1. Specific ranges of ratios may be from about 1:10 to about 1:5, or about 1:5 to about 1:1, or about 1:1 to about 5:1, or about 5:1 to about 10:1. Of course, in the embodiments where silica is entirely replaced with the micronized polymer, there is no such ratio. The loading ratio between micronized polymer and silica employed for a particular coating composition may depend on the type and use of coating composition, along with the gloss reduction and material properties of the coating composition, as applied.

ILLUSTRATIVE EXAMPLES

The present disclosure is now illustrated by the following non-limiting examples. It should be noted that various changes and modifications, can be applied to the following examples and processes, without departing from the scope of this disclosure, which is defined in the appended claims. Therefore, it should be noted that the following examples should be interpreted as illustrative only and not limiting in any sense.

Figure 1A:
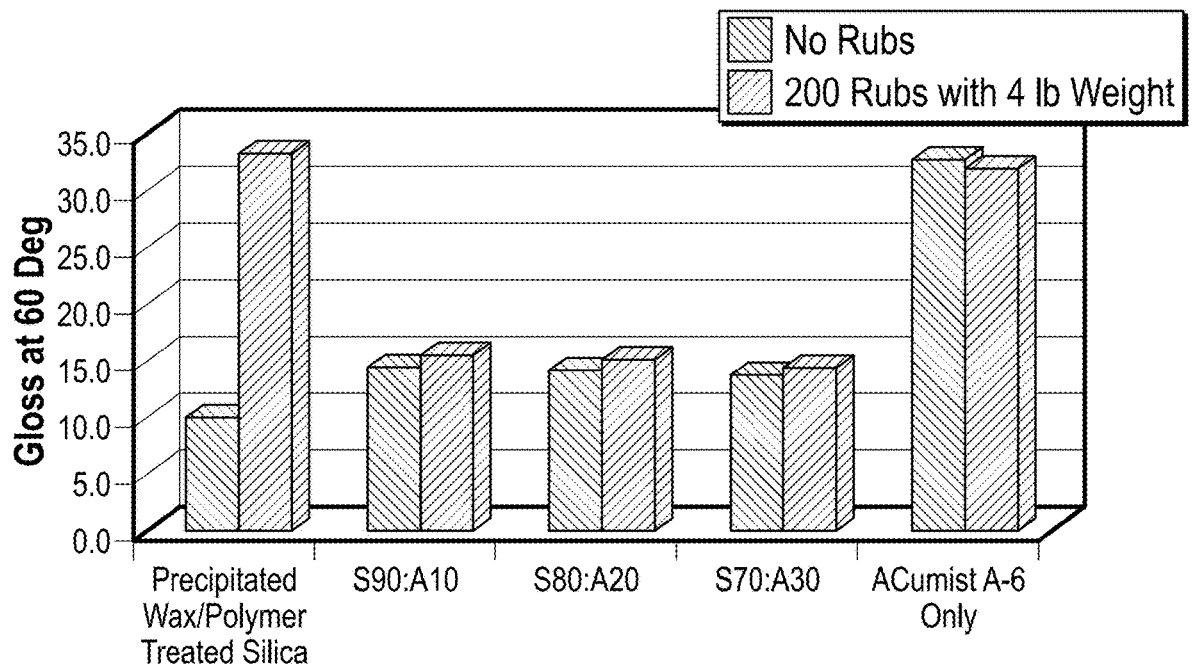
Figure 1B:
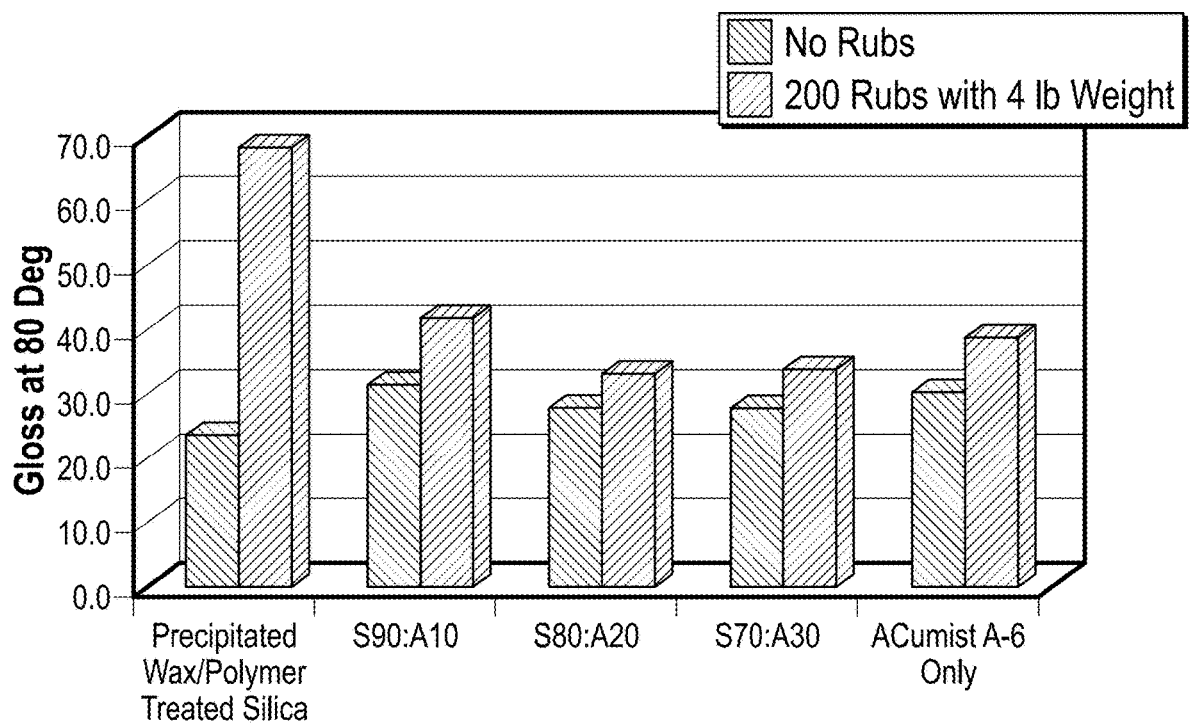
FIG. 1B shows the same testing at 85 degrees, wherein the loading of matting agent was 2%.

FIGS. 1A and 1B are graphs that illustrate the results of burnish testing on a aqueous, acrylic clear-coat composition, where gloss was measured at 60 degrees in FIG. 1A and at 85 degrees in FIG. 1B. Each example had a 2% by-weight loading of the matting agent, which range from pure silica on the left side of the graphs to pure micronized polymer on the right side of the graphs, with 90:10, 80:20, and 70:30 ratios of silica to micronized polymer in the middle. The experiment entailed employing a Sutherland Rub tester machine, rubbing each coating 200 times with 4 pounds of weight. The substrate was a Leneta Drawdown card and the abrading surface was either tying paper or also a Leneta card. As can be seen, the only poor performer in burnish resistance (i.e., the one that significantly increased gloss) was the pure silica example, whereas any inclusion, up to entirety of micronized polymer, substantially prevented an increase in gloss. Thus, the experiments demonstrated in FIGS. 1A and 1B demonstrate the beneficial property of using micronized polymers instead of silicas, for preventing burnishing in accordance with the embodiments of the present disclosure.

Figure 2A:
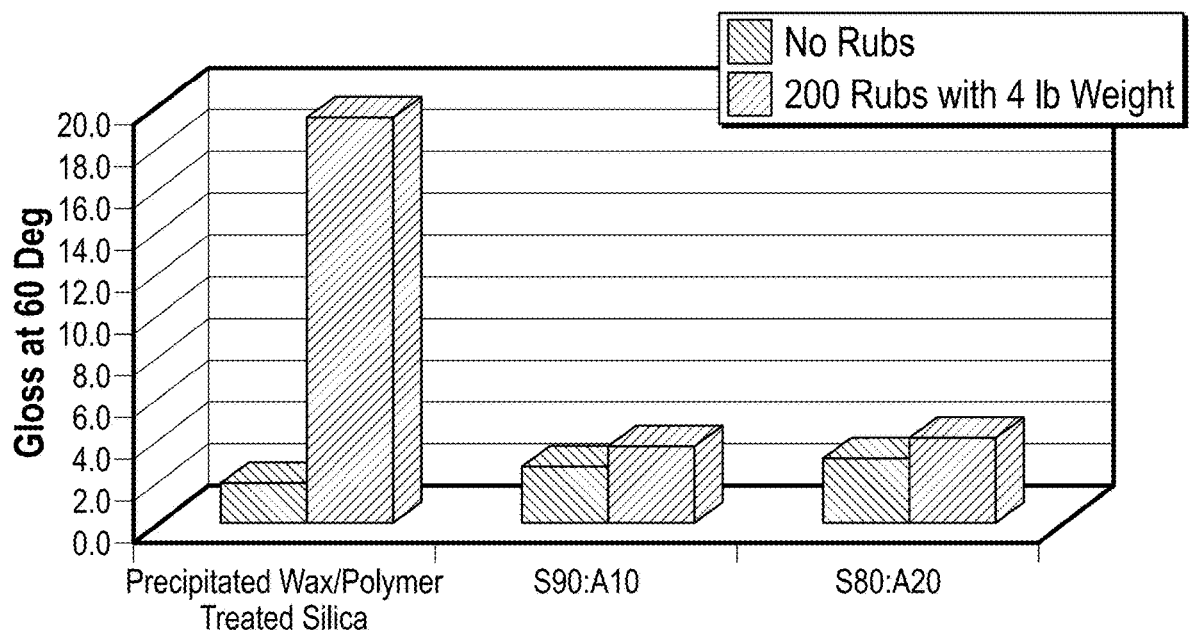
Figure 2B:
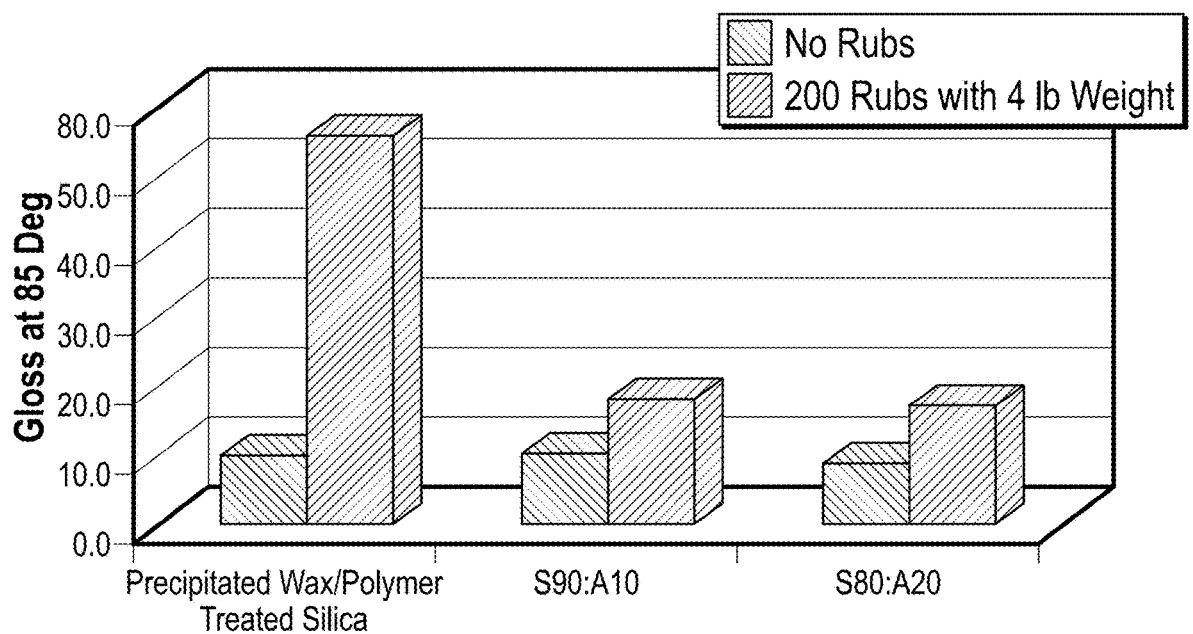
FIG. 2B shows the same testing at 85 degrees, wherein the loading of matting agent was 6%.

FIGS. 2A and 2B show similar results at 6% total loading of matting agent (wherein 100% silica, and ratios of silica to micronized polymer of 90:10 and 80:20 were tested and demonstrated).

Figure 3A:
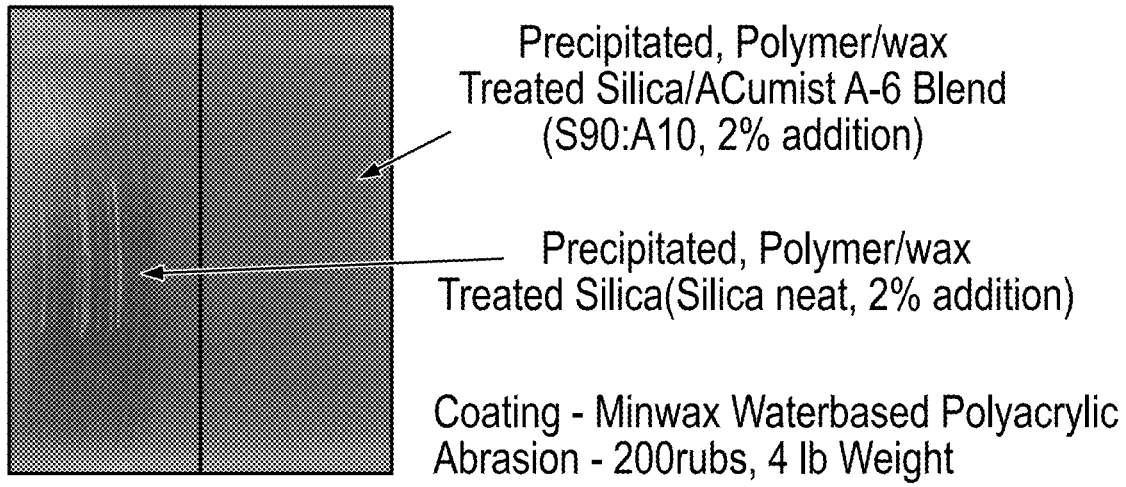
Figure 3B:
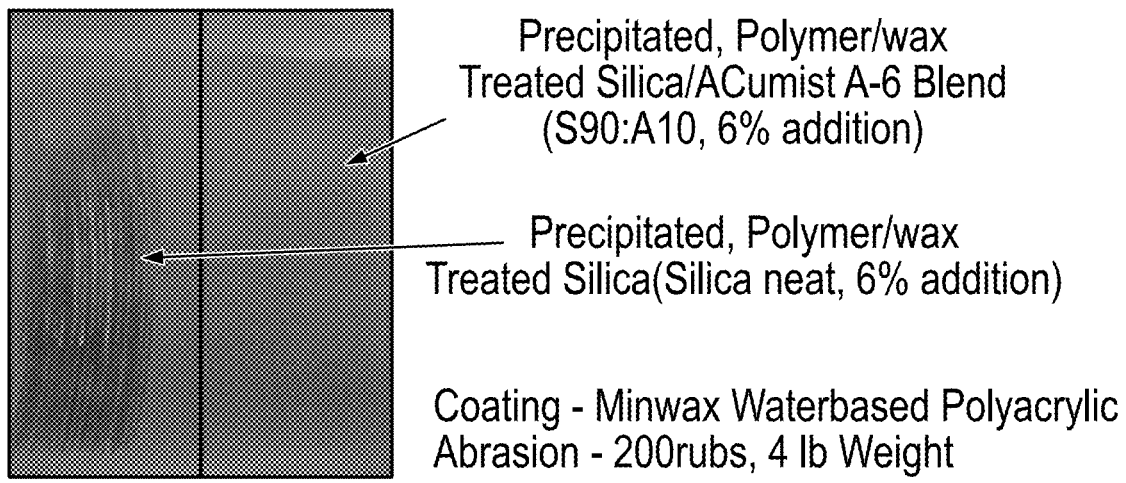
FIG. 3B shows the same test at 6% loading.

FIGS. 3A and 3B are pictures from an experiment to show the abrasion resistance of embodiments of the present disclosure, using 2% and 6% matting agent loading, respectively. On the left side, the matting agent was pure silica, whereas on the right side it was a silica to micronized polymer ratio of 90:10. Significantly more abrasion is observed on the left side, as compared to the right side, in both figures.

Figure 4A:
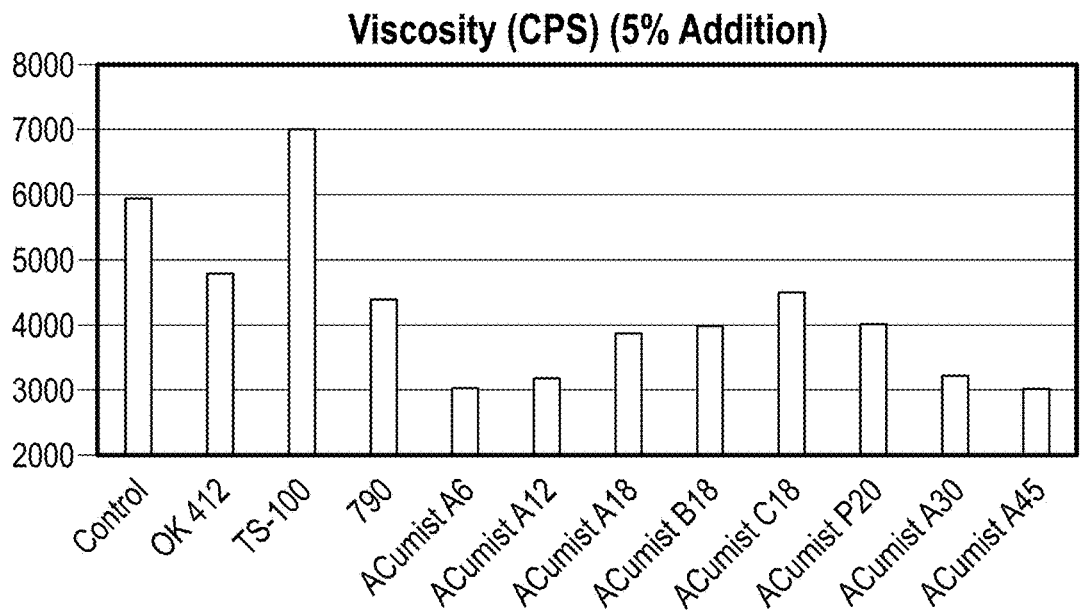
FIGS. 4A-4D are graphs showing the viscosity of various coating compositions including silica matting agents compared with micronized polymer matting agents.
Figure 4B:
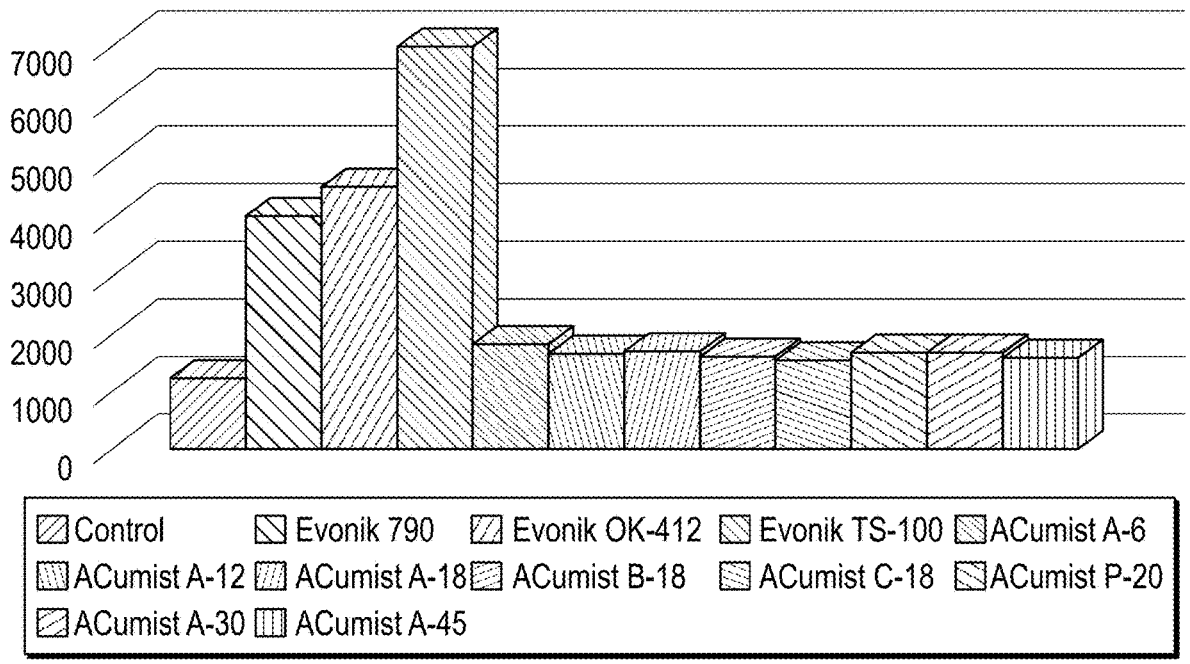
Figure 4C:
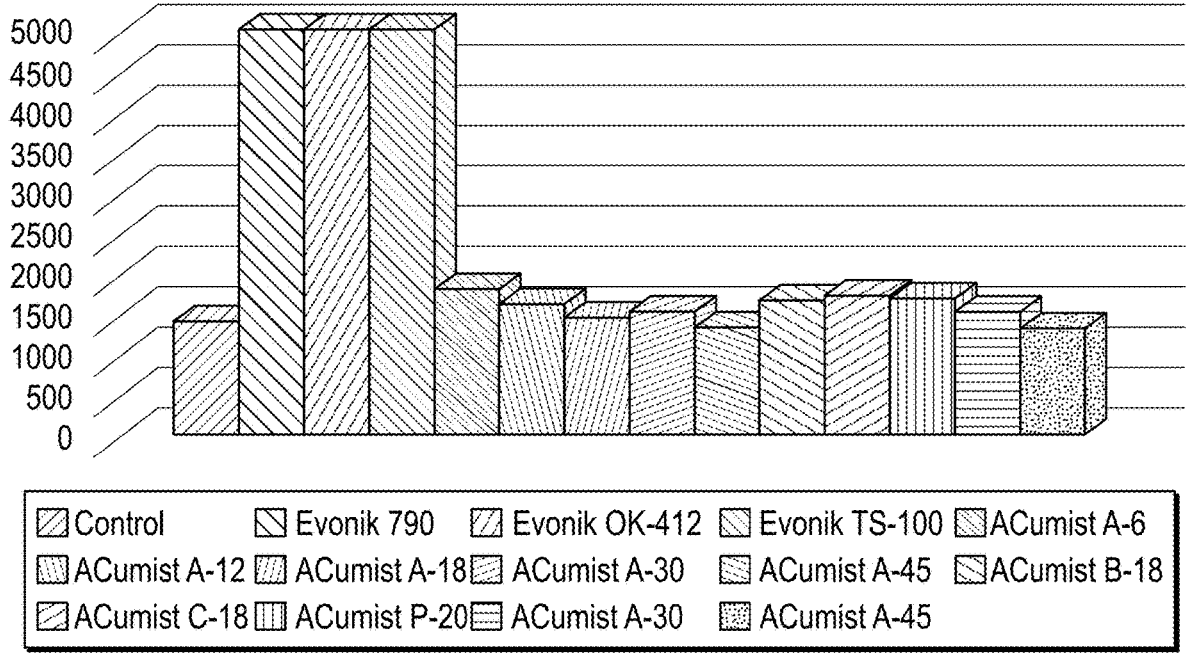
Figure 4D:
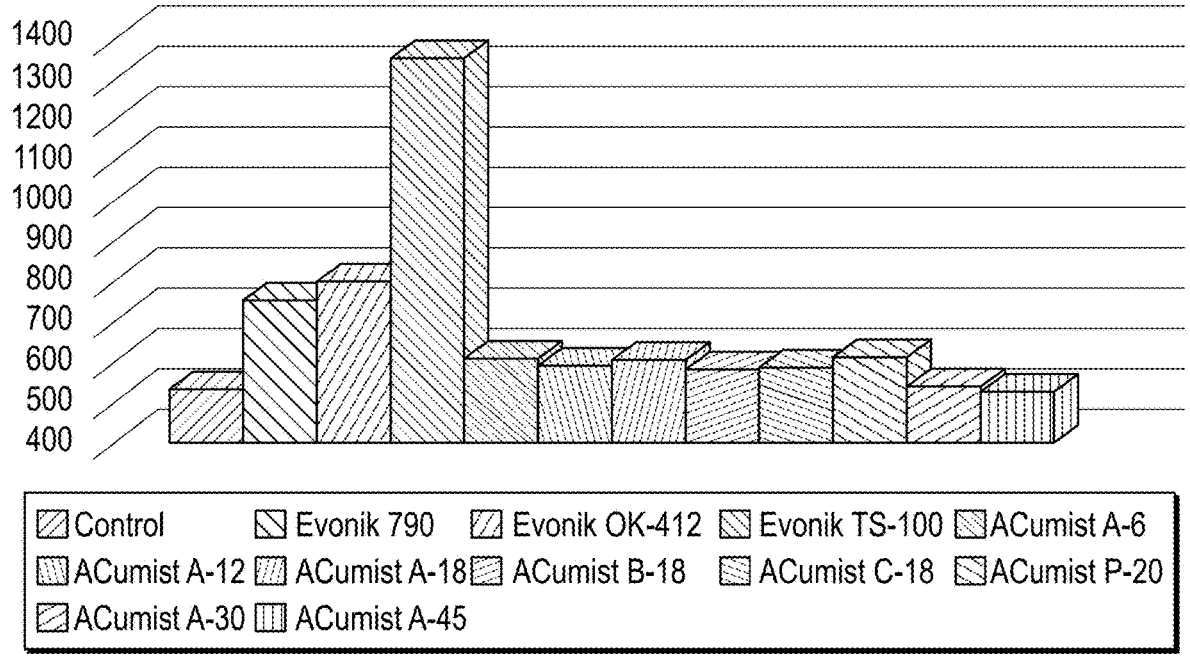

FIGS. 4A-4D are graphs that show the various viscosities of a variety of coatings when matting agents are added thereto. With regard to FIG. 4A, which represents a clear, acrylic, aqueous wood coating, the leftmost bar is the control (with no matting agent addition), the next three bars from left to right include 5% loading of various silica matting agents, and the final rightmost eight bars include 5% loading of various micronized polymer matting agents. FIGS. 4B-4D are configured in a similar manner, wherein FIG. 4B represents an architectural coating, FIG. 4C represents and epoxy coating, and FIG. 4D represents a solvent-based alkyd coating. As can be seen, the viscosity is much higher with the silica matting agents, as compared to the micronized polymer matting agents, across all coating types. This is believed to be due to the high oil absorption rating, inherent in silica. Thus, FIGS. 4A-4D demonstrates the benefit of lower viscosity in accordance with the embodiments of the present disclosure, which relates to the ease of application of the coating.

Figure 5A:
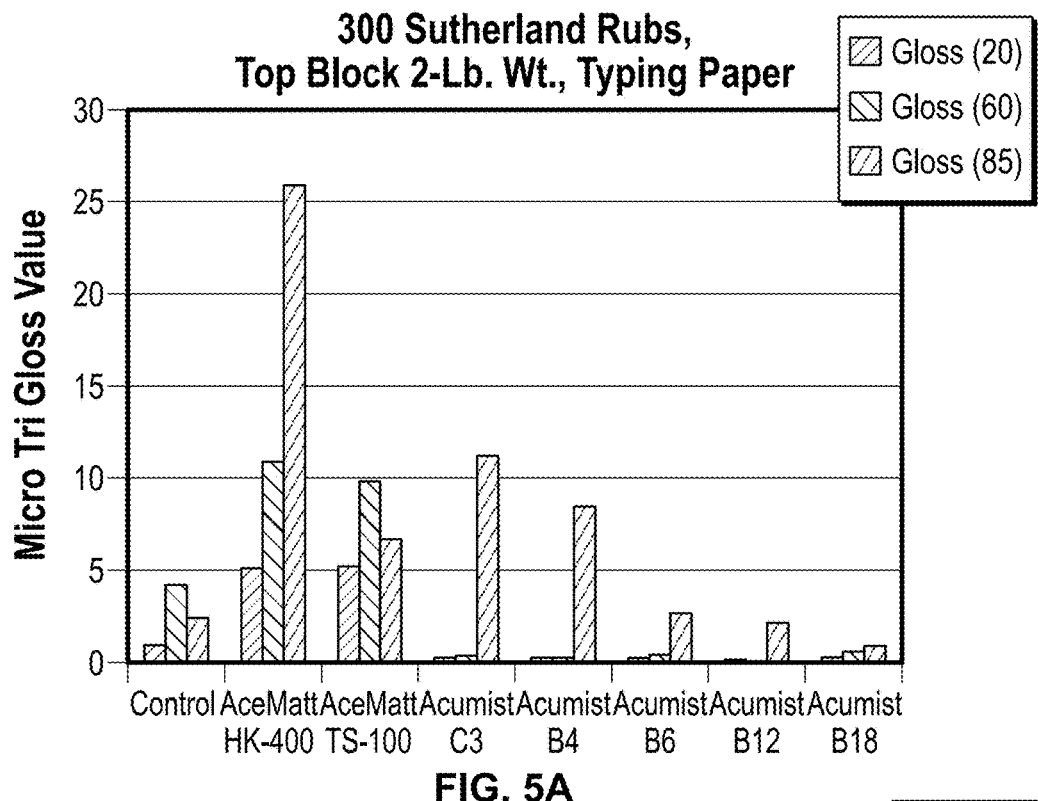
FIGS. 5A-5D are graphs showing the results of burnishing testing on various coating compositions at 20, 60, and 85 degrees gloss angle, wherein the loading of matting agent was 5% or 8%.
Figure 5B:
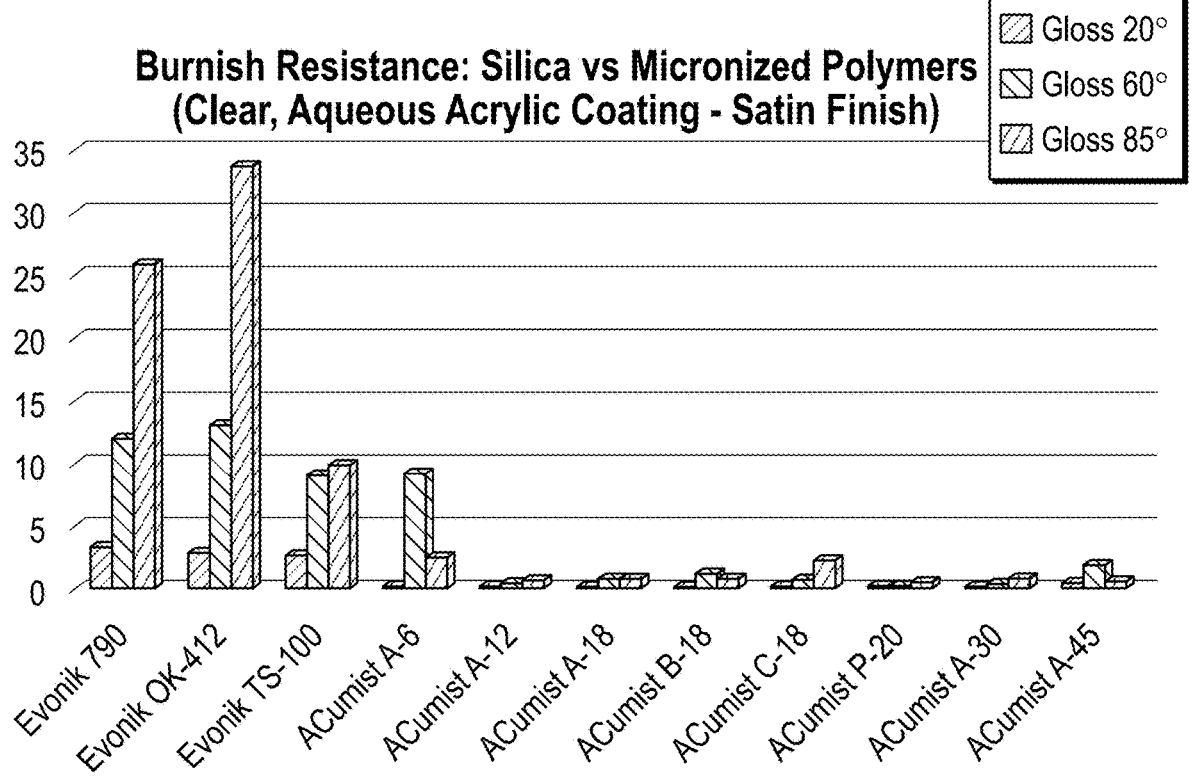
Figure 5C:
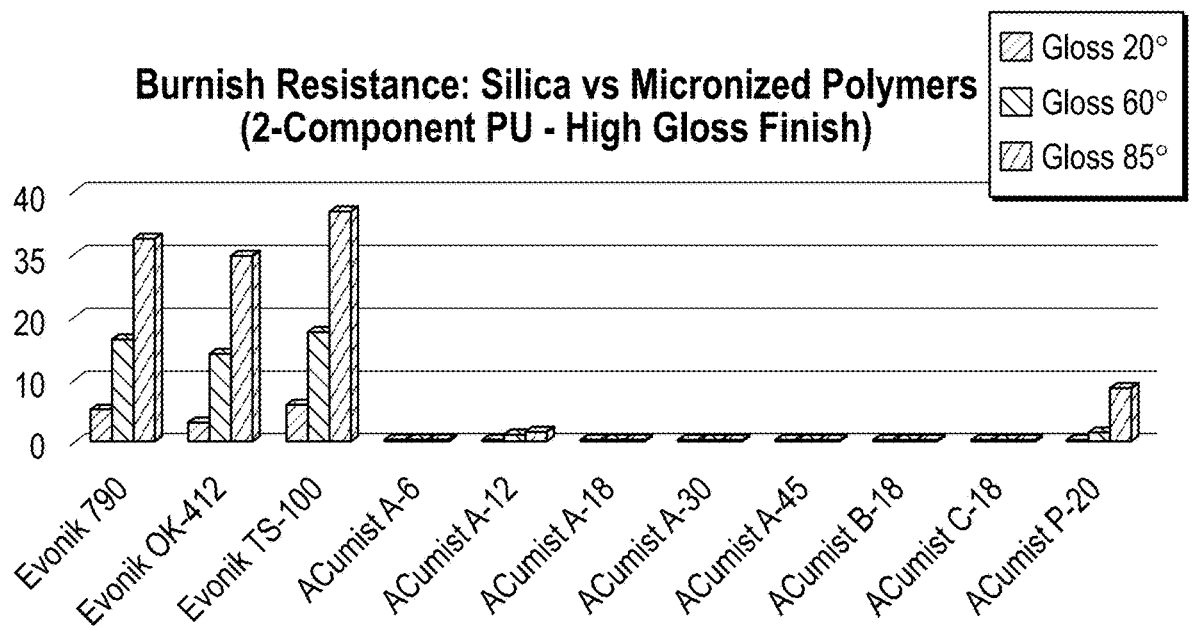
Figure 5D:
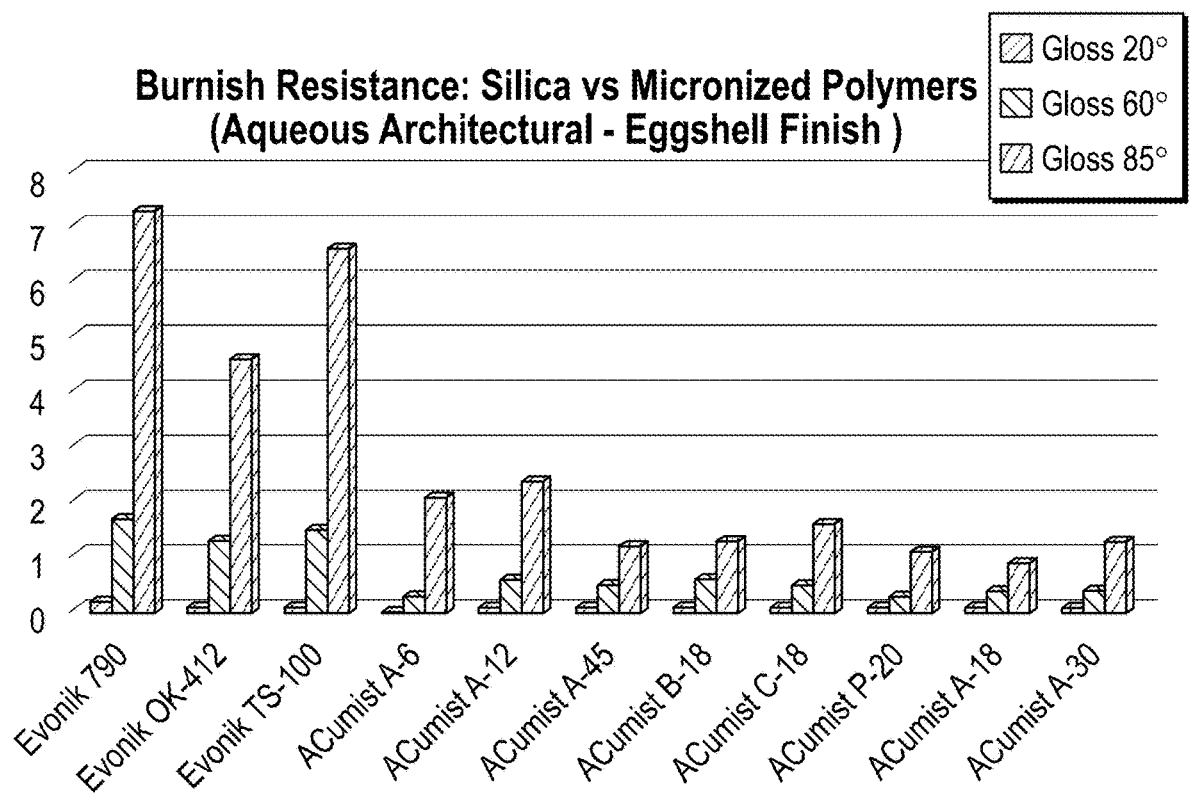

FIGS. 5A-5D demonstrates that the burnishing results of FIGS. 1A, 1B, 2A, and 2B, which were observed in clearcoats, are also observed in a variety of other coatings. For example, the testing shown in the graph of FIG. 5A is based on an off-set, paste ink rubbed with typing paper. The left bar group is a control, the next two bar groups to the right employed various silicas, and the rightmost five bar groups employed various micronized polymers. Testing was done at an 8% matting agent loading in FIG. 5A, and at 5% matting agent loading in FIGS. 5B-5D, and burnish resistance was measured at 20, 60, and 85 degree gloss values. FIGS. 5B-5D are configured similarly to FIG. 5A, and represent a clear, aqueous acrylic coating—satin finish (FIG. 5B), a two-component polyurethane coating—high gloss finish (FIG. 5C), and an aqueous, architectural coating—eggshell finish (FIG. 5D). As can be clearly seen, the gloss values that increased the least, after 300 rubs of 2 pounds weight, were the examples that utilized the micronized polymers as the matting agents. Furthermore, the burnishing resistance is most effective at the 85° gloss level, which is incident light, and most noticeable to the human eye. As such, the 85° gloss angle shows an initial higher efficiency in gloss reduction using micronized polymers than silicas, and therefore the micronized polymers exhibit higher performance as burnish resistance agents.

Figure 6A:
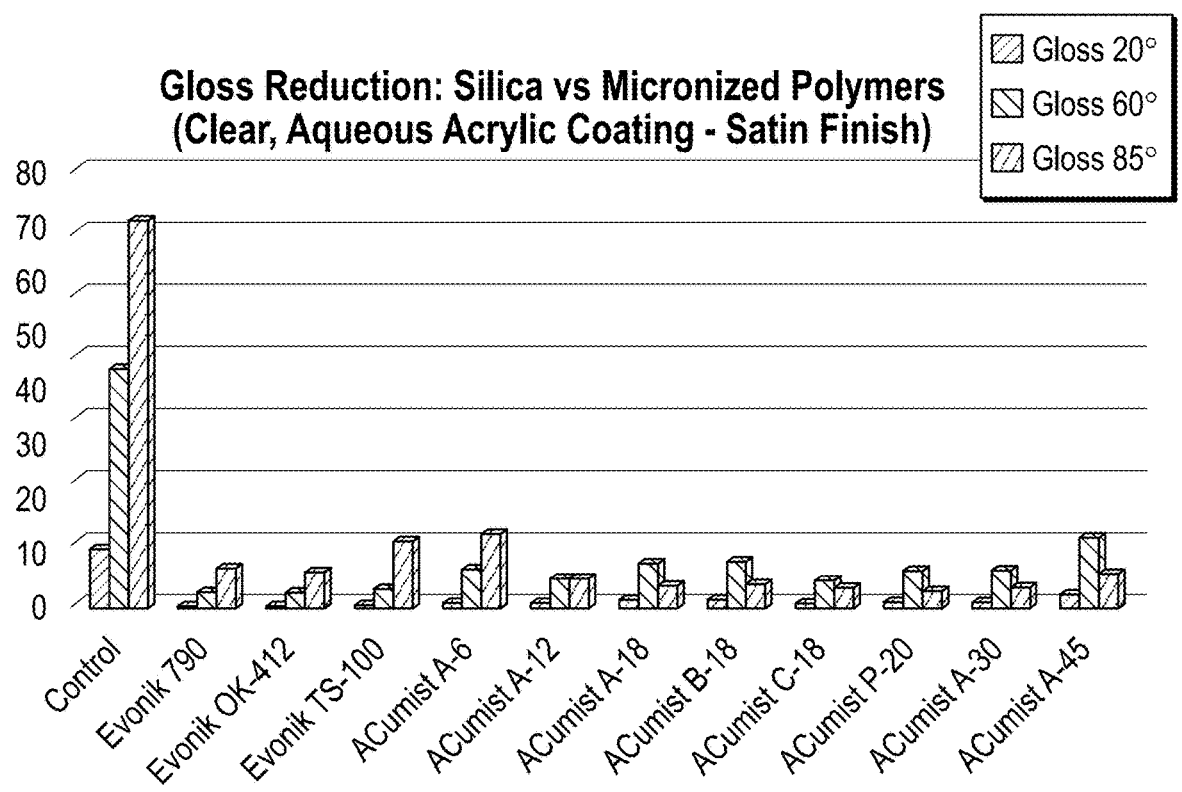
FIGS. 6A-6E are graphs showing the results of matting efficiency testing on various coating compositions at 20, 60, and 85 degrees gloss angle.
Figure 6B:
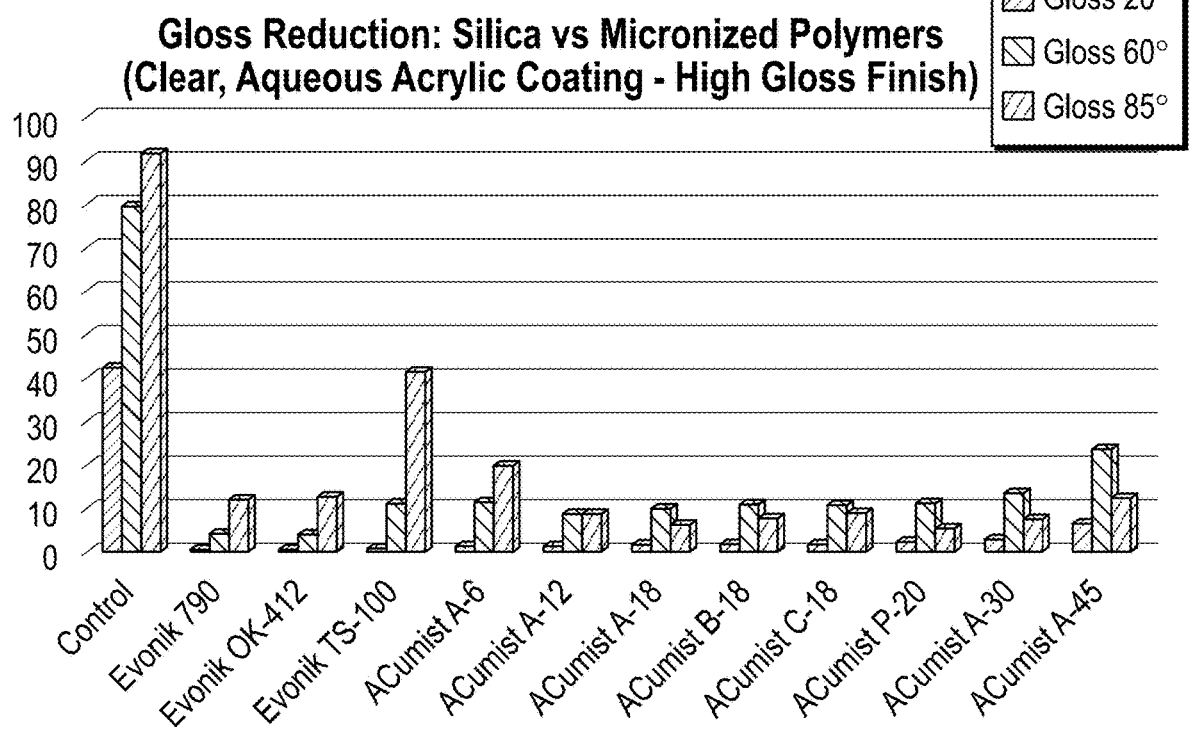
Figure 6C:
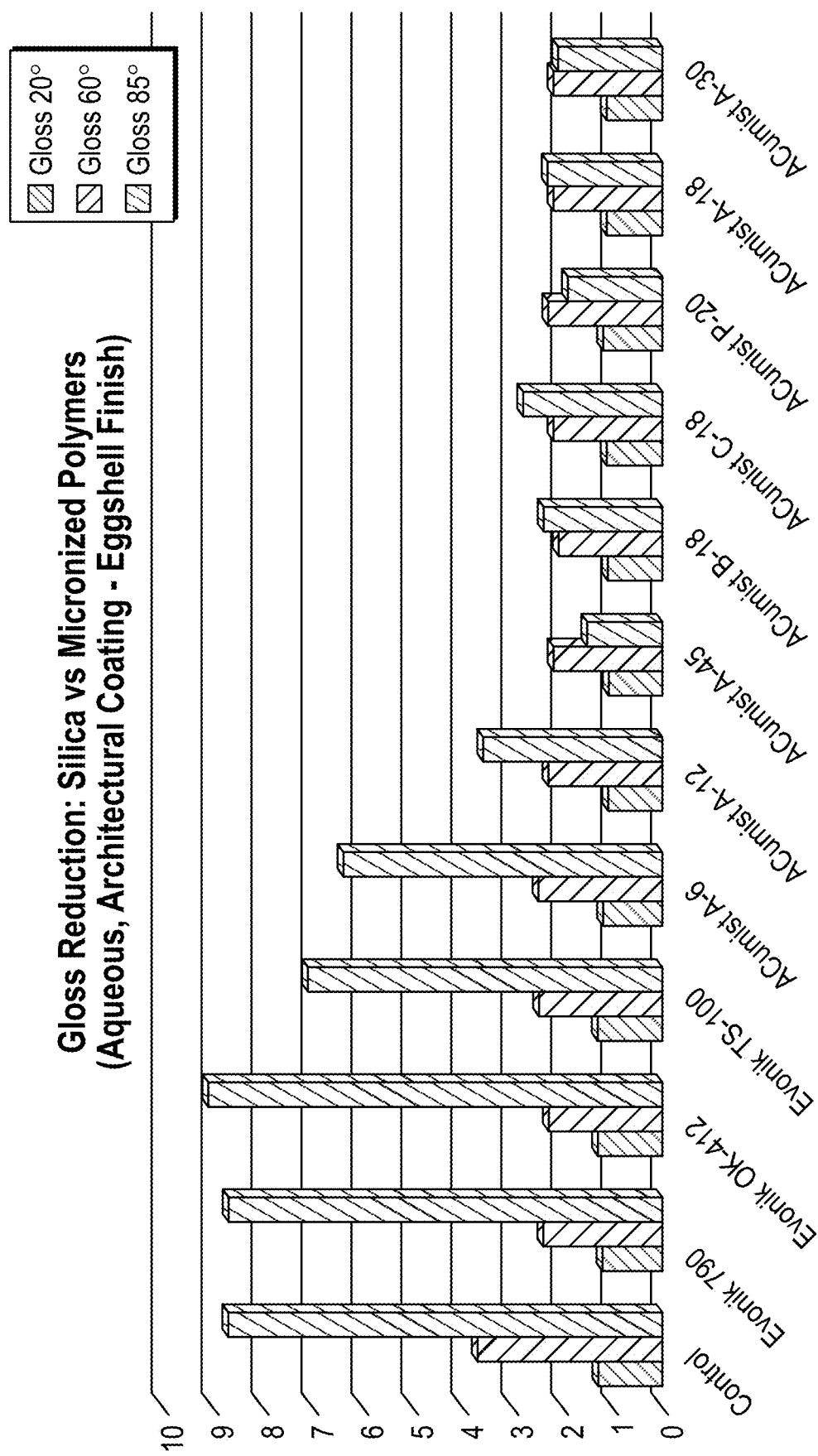
Figure 6D:
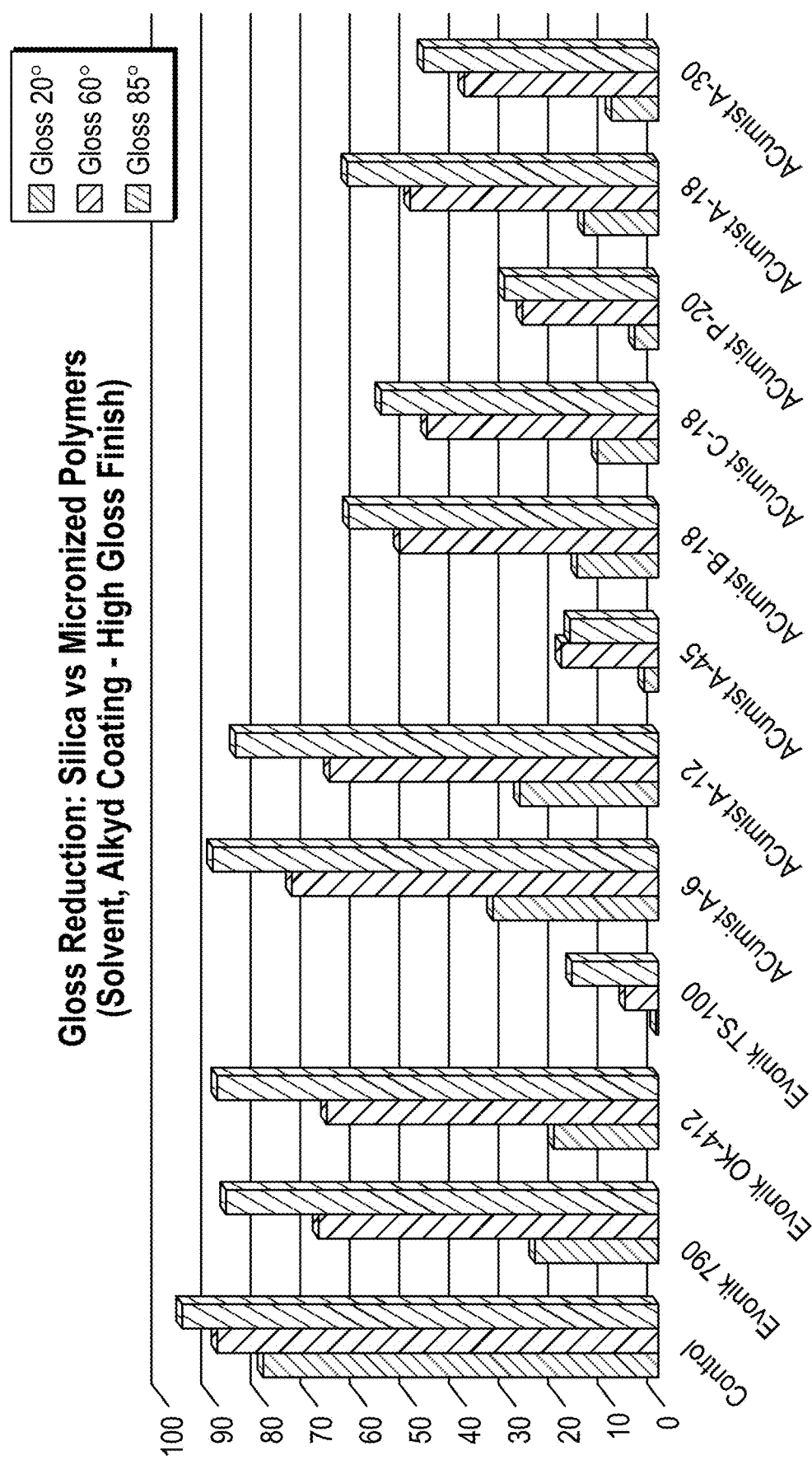
Figure 6E:
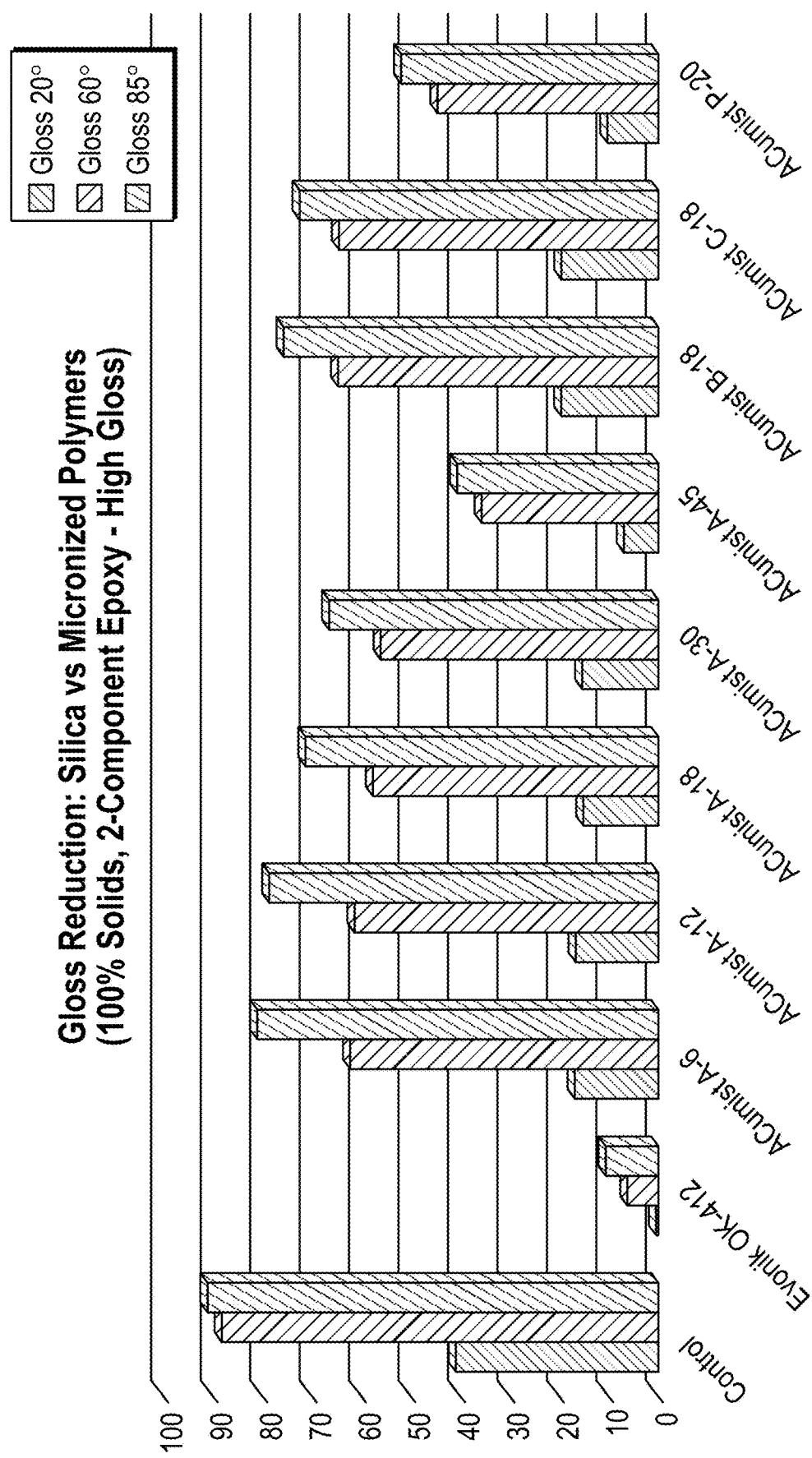

FIGS. 6A-6E are graphs showing the results of matting efficiency testing on various coating compositions at 20, 60, and 85 degrees gloss angle, at 5% matting agent loading. FIG. 6A represents a clear, aqueous acrylic coating, satin finish; FIG. 6B represents a clear, aqueous acrylic coating, high gloss finish; FIG. 6C represents an aqueous, architectural coating, eggshell finish; FIG. 6D represents a solvent, alkyd coating, high gloss finish; and FIG. 6E represents a two-component epoxy coating, high gloss. For each figure, the left bar group is a control, the next one to three bar groups to the right employed various silicas, and the rightmost bar groups employed various micronized polymers. As can be seen, the coatings employing the micronized polymers of the present disclosure exhibited superior matting efficiency.

Figure 7A:
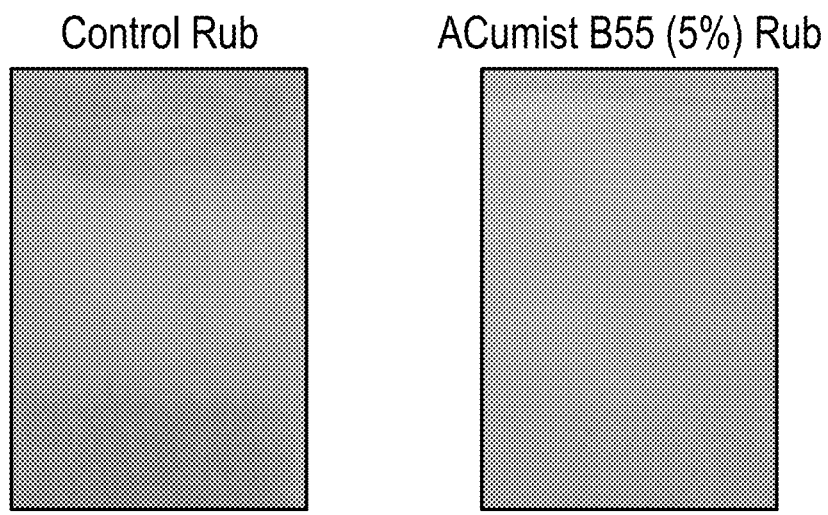
FIGS. 7A-7C are pictures showing the results of color transfer testing and scrub resistance testing on paint and ink compositions using 5% matting agent loading.
Figure 7B:
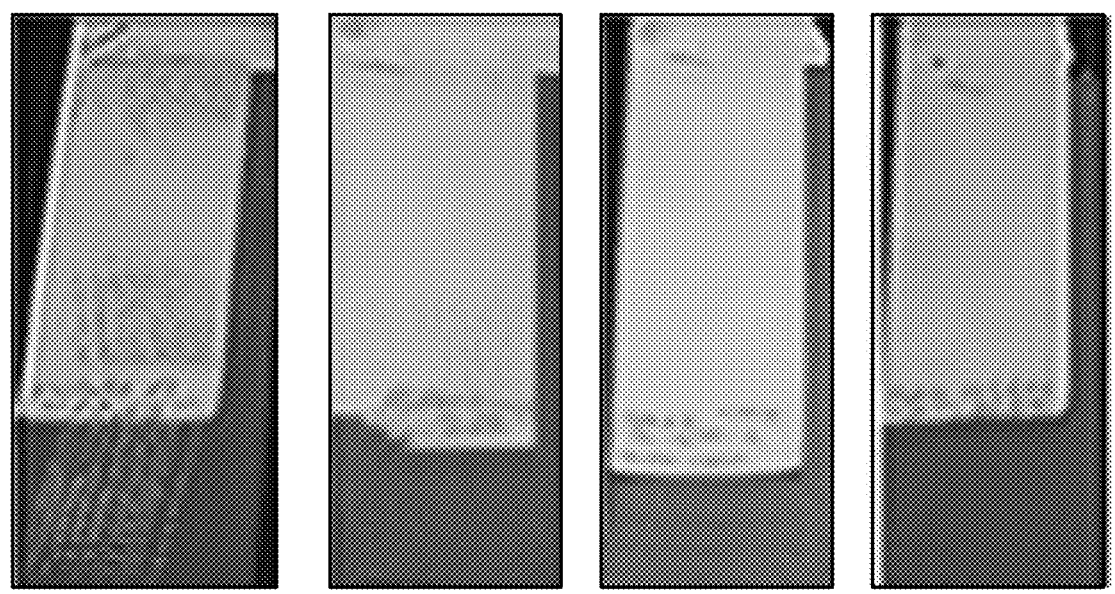
Figure 7C:
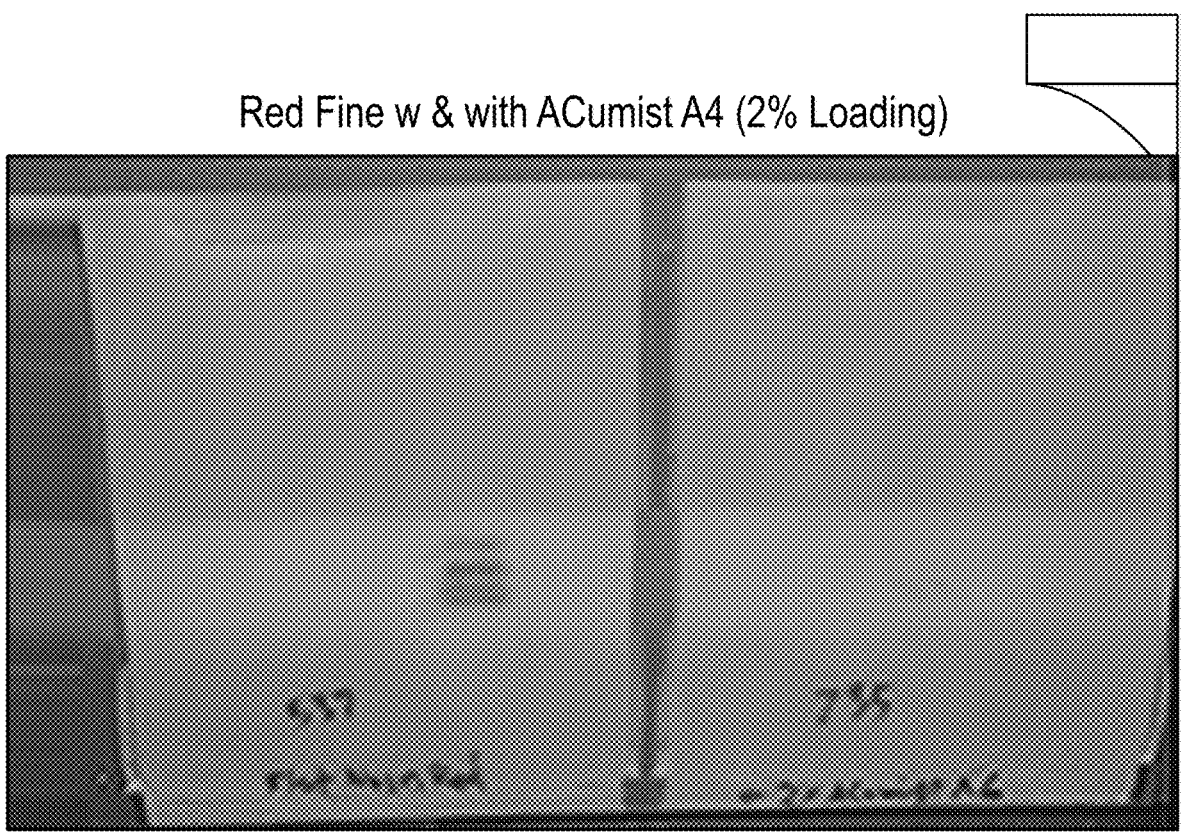

Still further, FIGS. 7A-7C illustrate the benefits of reduced color transfer, in the context of paints and inks having matting agents, in accordance with the present disclosure added thereto. As can be seen in FIG. 6A (paint) and FIG. 6B (ink), after 300 rubs of 2 pounds weight, the control example on the left (no micronized polymer addition), shows significantly more color transfer than the inventive example on the right, that included a 5% by weight loading of the micronized polymer matting agent. Additionally, FIG. 6C shows the scrub resistance of embodiments of the present disclosure.

Figure 8:
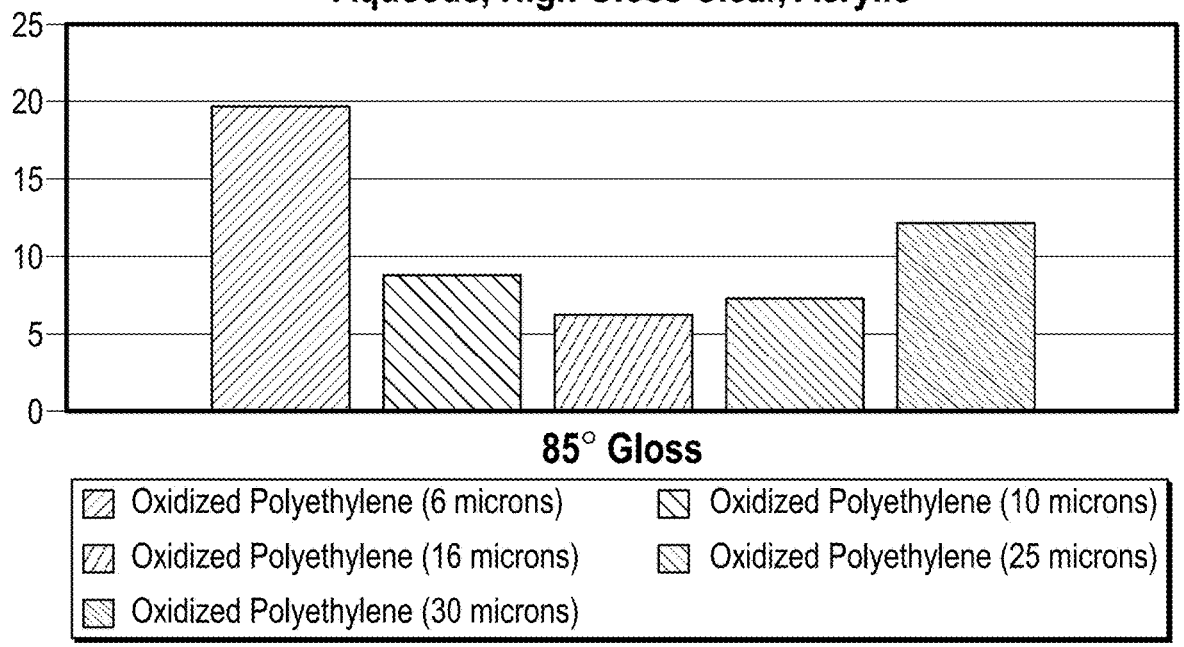
FIG. 8 is a graph showing gloss reduction with various particle sizes of oxidized polyethylene micronized polymer after a 5% polymer addition to the control coating.
Figure 9:
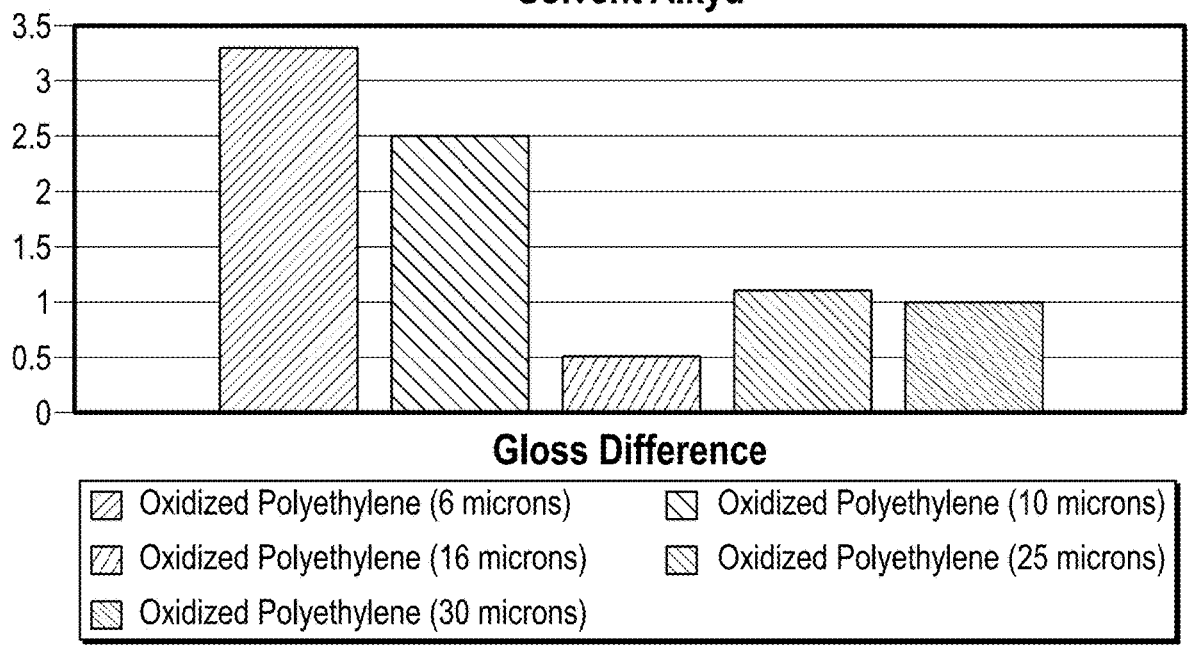
FIG. 9 is a graph showing burnish resisting with various particle sizes of oxidized polyethylene micronized polymer after a 5% polymer addition to the control coating.
Figure 10:
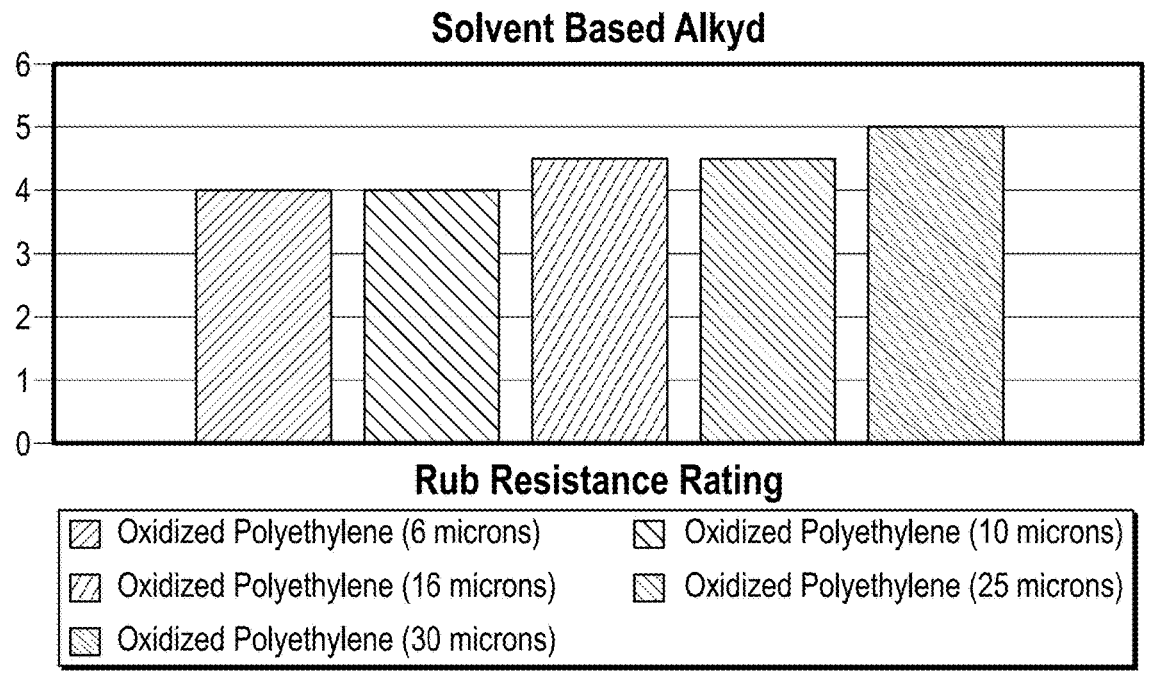
FIG. 10 is a graph showing rub resistance with various particle sizes of oxidized polyethylene micronized polymer after a 5% polymer addition to the control coating.
Figure 11:
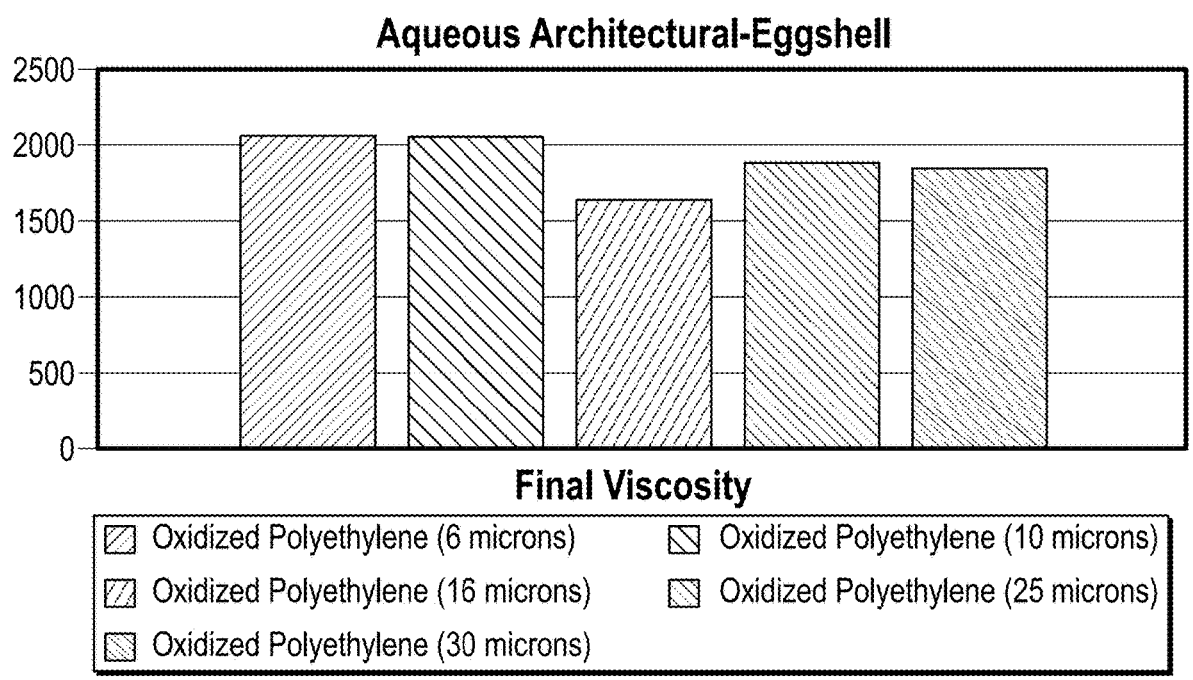
FIG. 11 is a graph showing viscosity increase with various particle sizes of oxidized polyethylene micronized polymer after a 5% polymer addition to the control coating.

FIGS. 8-11 demonstrate the effects of differences in particle size in terms of gloss reduction, burnish resistance, rub resistance, and viscosity increase. For example, FIG. 8 is a graph showing gloss reduction with various particle sizes of oxidized polyethylene micronized polymer, particularly ranging in size from 6 microns to 30 microns (85° gloss measurement, after a 5% polymer addition to the control coating, which had a starting 85° gloss of 91.9), as added to an aqueous, high gloss clear acrylic coating. FIG. 9 is a graph showing burnish resistance with various particle sizes of oxidized polyethylene micronized polymer, particularly ranging in size from 6 microns to 30 microns (85° gloss measurement, after a 5% polymer addition to the control coating, then burnishing with 80 g A4 printing paper, with 4 pounds for 200 cycles by Sutherland 2000 rub resistance tester), as added to a solvent-based alkyd coating. Furthermore, FIG. 10 is a graph showing rub resistance with various particle sizes of oxidized polyethylene micronized polymer, particularly ranging in size from 6 microns to 30 microns (after a 5% polymer addition to the control coating, then rubbing with 80 g A4 printing paper, with 4 pounds for 200 cycles by Sutherland 2000 rub resistance tester), as added to a solvent-based alkyd coating. Still further, FIG. 11 is a graph showing viscosity increase with various particle sizes of oxidized polyethylene micronized polymer, particularly ranging in size from 6 microns to 30 microns (after a 5% polymer addition to the control coating, then measuring the viscosity difference versus control, on a Brookfield viscometer), as added to an aqueous architectural-eggshell coating.

Figure 12A:
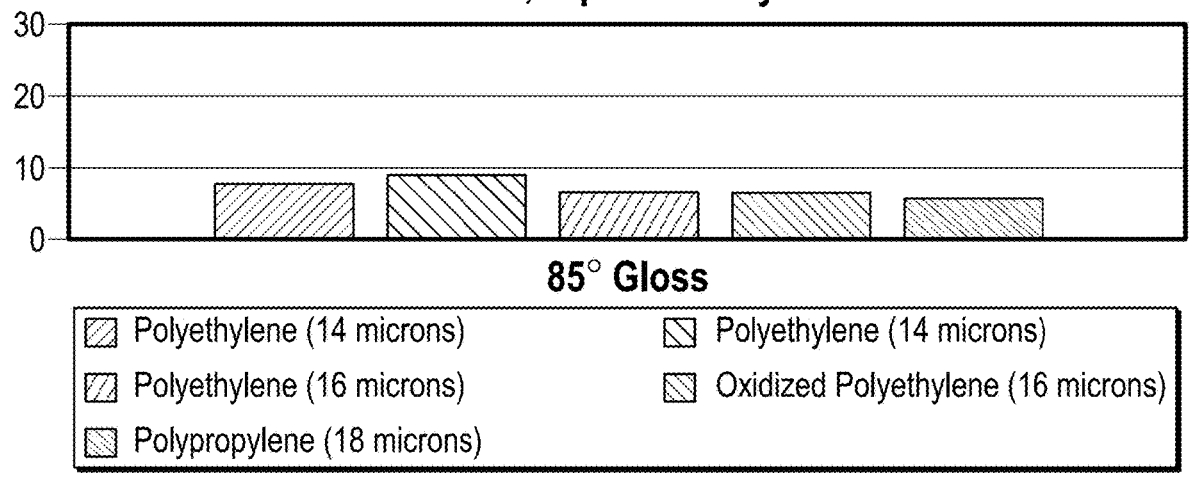
FIGS. 12A-12B are graphs showing gloss reduction with various particle sizes of polyethylene, oxidized polyethylene, and polypropylene micronized polymer after a 5% polymer addition to the control coating (acrylic and polyurethane coatings, respectively)
Figure 12B:
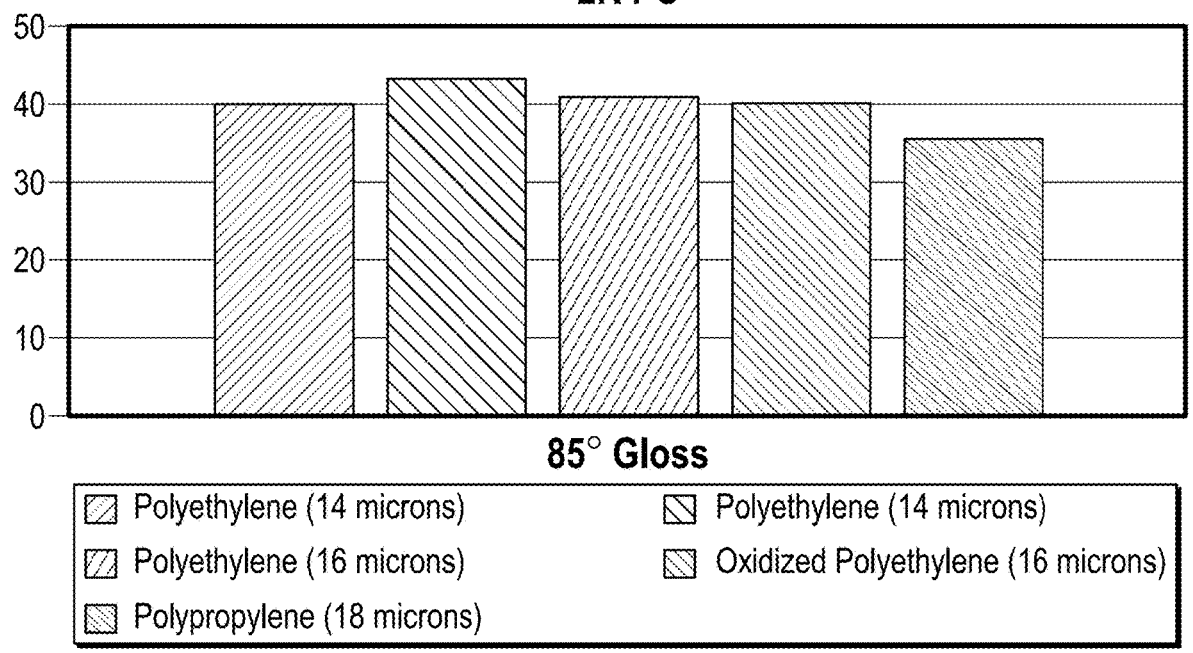
Figure 13:
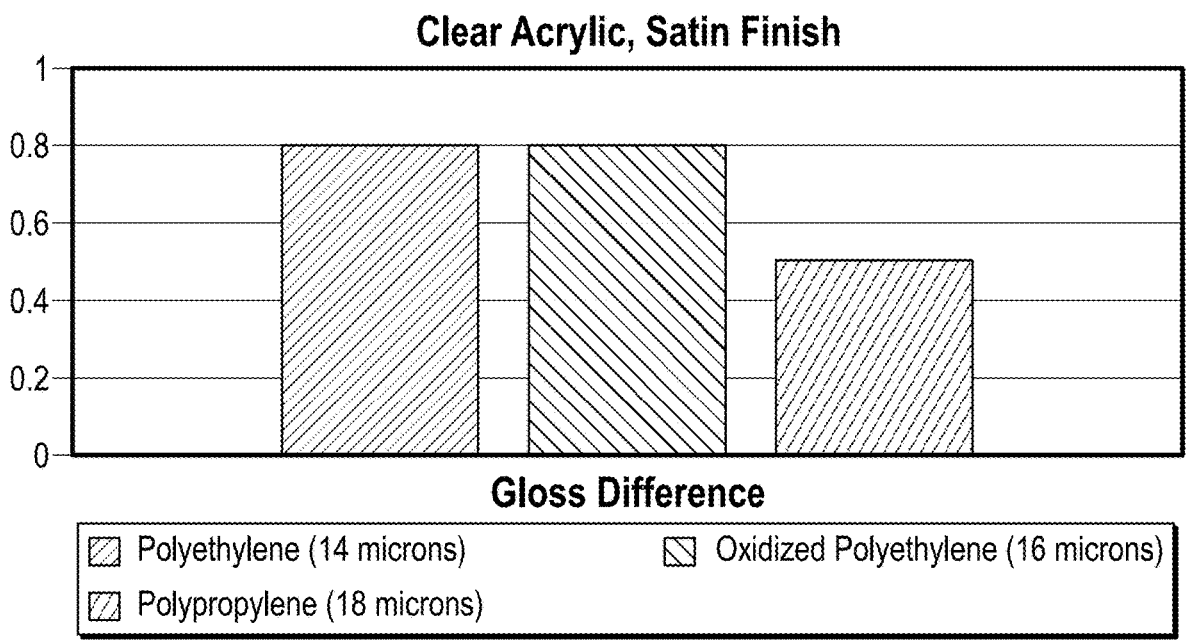
FIG. 13 is a graph showing burnish resistance with various particle sizes of polyethylene, oxidized polyethylene, and polypropylene micronized polymer after a 5% polymer addition to the control coating.

Additionally, FIGS. 12A-15 demonstrate further testing results in terms of gloss reduction, burnish resistance, rub resistance, and viscosity increase, with various polymer types. For example, FIG.12A is a graph showing gloss reduction with various particle sizes of polyethylene, oxidized polyethylene, and polypropylene micronized polymer, particularly ranging in size from 14 microns to 18 microns (85° gloss measurement, after a 5% polymer addition to the control coating, which had a starting 85° gloss of 91.9), as added to a clear, aqueous acrylic coating. FIG. 12B is a graph showing gloss reduction with various particle sizes of polyethylene, oxidized polyethylene, and polypropylene micronized polymer, particularly ranging in size from 14 microns to 18 microns (85° gloss measurement, after a 5% polymer addition to the control coating, which had a starting 85° gloss of 97.9), as added to a 2K polyurethane coating. FIG. 13 is a graph showing burnish resistance with various particle sizes of polyethylene, oxidized polyethylene, and polypropylene micronized polymer, particularly ranging in size from 14 microns to 18 microns (85° gloss measurement, after a 5% polymer addition to the control coating, then burnishing with 80 g A4 printing paper, with 4 pounds for 200 cycles by Sutherland 2000 rub resistance tester), as added to a clear acrylic satin finish. Furthermore, FIG. 14 is a graph showing rub resistance with various particle sizes of polyethylene, oxidized polyethylene, and polypropylene micronized polymer, particularly ranging in size from 14 microns to 18 microns (after a 5% polymer addition to the control coating, then rubbing with 80 g A4 printing paper, with 4 pounds for 200 cycles by Sutherland 2000 rub resistance tester), as added to an epoxy coating. Still further, FIG. 15 is a graph showing viscosity increase with various particle sizes of polyethylene, oxidized polyethylene, and polypropylene micronized polymer, particularly ranging in size from 14 microns to 18 microns (after a 5% polymer addition to the control coating, then measuring the viscosity difference versus control, on a Brookfield viscometer), as added to an epoxy coating.

In general, the benefits that can be observed in accordance with embodiments of the present disclosure include: resistance to burnishing; good mar, scrub, abrasion, and scratch resistance; good surface slip and feel; minimal, or no loss of matting efficiency of the coating, during storage for long periods of time; minimal or no settling during storage; low friability; low binder demand; low viscosity build-up; and equivalent, or superior gloss reduction capability. Furthermore, in general, the negative impacts avoided in accordance with embodiments of the present disclosure include: burnishing; poor mar, scrub, abrasion, and scratch resistance, poor surface slip and feel, loss of matting efficiency over time; tendency to settle in storage; friability; high binder demand; and viscosity build.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art, with a convenient road map, for implementing the exemplary embodiment or exemplary embodiments. It should be understood that various changes can be made, in the function and arrangement of elements, without departing from the scope of the disclosure, as set forth in the appended claims and the legal equivalents thereof.

What is claimed is:

1. A matte finish coating for application to a substrate, comprising in a mixture:
   a coating substance; and
   a non-emulsified micronized polymer matting agent comprising a micronized high-density polyethylene (HDPE) polymer or a micronized low-density polyethylene (LDPE) polymer wherein the HDPE or LDPE has an average particle diameter of about 6 microns to about 30 microns; and
   wherein the matte finish coating comprises the micronized polymer matting agent in an amount, by overall weight of the matte finish coating, of about 0.5% to about 15%.

2. The matte finish coating of claim 1, wherein the matte finish coating comprises the micronized polymer matting agent in an amount, by overall weight of the matte finish coating, of about 1.0% to about 12%.

3. The matte finish coating of claim 2, wherein the matte finish coating comprises the micronized polymer matting agent in an amount, by overall weight of the matte finish coating, of about 1.5% to about 10%.

4. The matte finish coating of claim 1, wherein the coating substance comprises a clear-coat composition or a pigmented coating composition.

5. The matte finish coating of claim 1, wherein the coating substance comprises a paint composition.

6. The matte finish coating of claim 1, wherein the coating substance comprises an ink composition.

7. The matte finish coating of claim 1, wherein the weight ratio of the micronized polymer matting agent to the optional silica matting agent is about 10:1 to about 1:10.

8. The matte finish coating of claim 7, wherein a weight ratio of the micronized polymer matting agent to the silica matting agent is about 5:1 to about 1:5.

9. The matte finish coating of claim 8, wherein a weight ratio of the micronized polymer matting agent to the silica matting agent is about 2:1 to about 1:2.

10. The matte finish coating of claim 1, wherein an average particle diameter of the micronized polymer is from about 10 microns to about 25 microns.

11. The matte finish coating of claim 10, wherein an average particle diameter of the micronized polymer is from about 14 microns to about 18 microns.

12. A substrate comprising the matte finish coating of claim 1 coated on at least one surface thereof.

13. The matte finish coating of claim 1, wherein the silica matting agent comprises 0.5% to about 15% by weight of the matte finish coating composition.

14. A matte finish coating for application to a substrate, comprising of in a mixture:
   a coating substance;
   a non-emulsified micronized polymer matting agent consisting essentially of a micronized high-density polyethylene (HDPE) polymer or a micronized low-density polyethylene (LDPE) polymer wherein the HDPE or LDPE has an average particle diameter of about 6 microns to about 30 microns; and
   wherein the matte finish coating comprises the micronized polymer matting agent in an amount, by overall weight of the matte finish coating, of about 0.5% to about 15%.

* * * * *